US007744179B2

(12) United States Patent
Doi et al.

(10) Patent No.: US 7,744,179 B2
(45) Date of Patent: Jun. 29, 2010

(54) RECORDING APPARATUS AND RECORDING METHOD

(75) Inventors: Takatsugu Doi, Kanagawa (JP); Masaya Ikuno, Kanagawa (JP); Ken Hashimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 405 days.

(21) Appl. No.: 11/810,398

(22) Filed: Jun. 5, 2007

(65) Prior Publication Data

US 2008/0136892 A1 Jun. 12, 2008

(30) Foreign Application Priority Data

Dec. 6, 2006 (JP) ............................ 2006-329626

(51) Int. Cl.
*B41J 2/005* (2006.01)
*B41J 2/01* (2006.01)
*C09D 11/00* (2006.01)

(52) U.S. Cl. ......................................................... 347/1

(58) Field of Classification Search ..................... 347/1, 347/213
See application file for complete search history.

(56) References Cited

U.S. PATENT DOCUMENTS

2007/0165204 A1* 7/2007 Kibayashi et al. ............. 355/78
2008/0032074 A1* 2/2008 Doi et al. .................... 428/34.1
2008/0196621 A1* 8/2008 Ikuno et al. .............. 106/31.13

FOREIGN PATENT DOCUMENTS

| | | |
|---|---|---|
| JP | 11-188858 | 7/1999 |
| JP | 2000-94654 | 4/2000 |
| JP | 2000-343808 | 12/2000 |
| JP | 2001-010114 | 1/2001 |
| JP | 2001-011349 | 1/2001 |
| JP | 2002-321443 | 11/2002 |
| JP | 2002-370347 | 12/2002 |
| JP | 2003-57967 | 2/2003 |
| JP | 2006-347085 | * 12/2006 |

OTHER PUBLICATIONS

Computer-generated translation of JP 2006-347085, published Dec. 2006.*

* cited by examiner

*Primary Examiner*—Huan H Tran
(74) *Attorney, Agent, or Firm*—Fildes & Outland, P.C.

(57) ABSTRACT

A recording apparatus has an intermediate transfer member; a feeding unit that feeds, to the intermediate transfer member, ink receptive particles containing at least an organic resin whose monomers include at least one polar monomer having at least one polar group, a ratio of the at least one polar monomer to all the monomers of the organic resin being about 10 mol % to about 90 mol %; a liquid application unit that applies a liquid that neutralizes the at least one polar group of the at least one polar monomer onto the ink receptive particles fed onto the intermediate transfer member; an ink application unit that applies an ink to the ink receptive particles fed onto the intermediate transfer member; a transfer unit that transfers the ink receptive particles onto a recording medium; and a fixing unit that fixes the ink receptive particles on the recording medium.

18 Claims, 8 Drawing Sheets

RECORDING APPARATUS AND RECORDING METHOD

CROSS-REFERENCE TO RELATED APPLICATION

This application is based on and claims priority under 35 USC 119 from Japanese Patent Application No. 2006-329626 filed on Dec. 6, 2006.

BACKGROUND

1. Technical Field

The invention relates to a recording apparatus and a recording method.

2. Related Art

An ink jet recording method is known as one method of recording an image or data by using ink. The principle of the ink jet recording method is to record an image or data on paper, cloth, film or the like by ejecting liquid or melted ink from a nozzle, a slit, a porous film or the like. A charge control method of ejecting ink by making use of electrostatic attraction force, a pressure pulse method of ejecting ink by making use of the oscillation pressure of piezo elements, and a thermal ink jet method of ejecting ink by making use of pressure caused by forming and growing foams by high heat, have been proposed as an ink ejecting methods. Recorded matters on which images or data of extremely high definition are recorded can be obtained by these methods.

In recording methods using ink, including the ink jet recording method, methods of first recording an image or data on an intermediate member and then transferring the image or data to a recording medium have been proposed in order to record image or data of high quality on various recording media such as permeable media and impermeable media.

SUMMARY

According to an aspect of the invention, a recording apparatus has: an intermediate transfer member; a feeding unit that feeds, to the intermediate transfer member, ink receptive particles containing at least an organic resin whose monomers include at least one polar monomer having at least one polar group, a ratio of the at least one polar monomer to all the monomers of the organic resin being approximately 10 mol % to approximately 90 mol %; a liquid application unit that applies a liquid that neutralizes the at least one polar group of the at least one polar monomer, onto the ink receptive particles fed onto the intermediate transfer member; an ink application unit that applies an ink to the ink receptive particles fed onto the intermediate transfer member; a transfer unit that transfers the ink receptive particles onto a recording medium; and a fixing unit that fixes the ink receptive particles on the recording medium.

BRIEF DESCRIPTION OF THE DRAWINGS

Exemplary embodiments of the invention will be described in detail based on the following figures, wherein.

DETAILED DESCRIPTION

Hereinafter, the exemplary embodiments of the invention are described by reference to the drawings. Members having substantially the same action and function are assigned the same symbol throughout the drawings and may not be repeatedly described.

First Exemplary Embodiment

Figure 1:
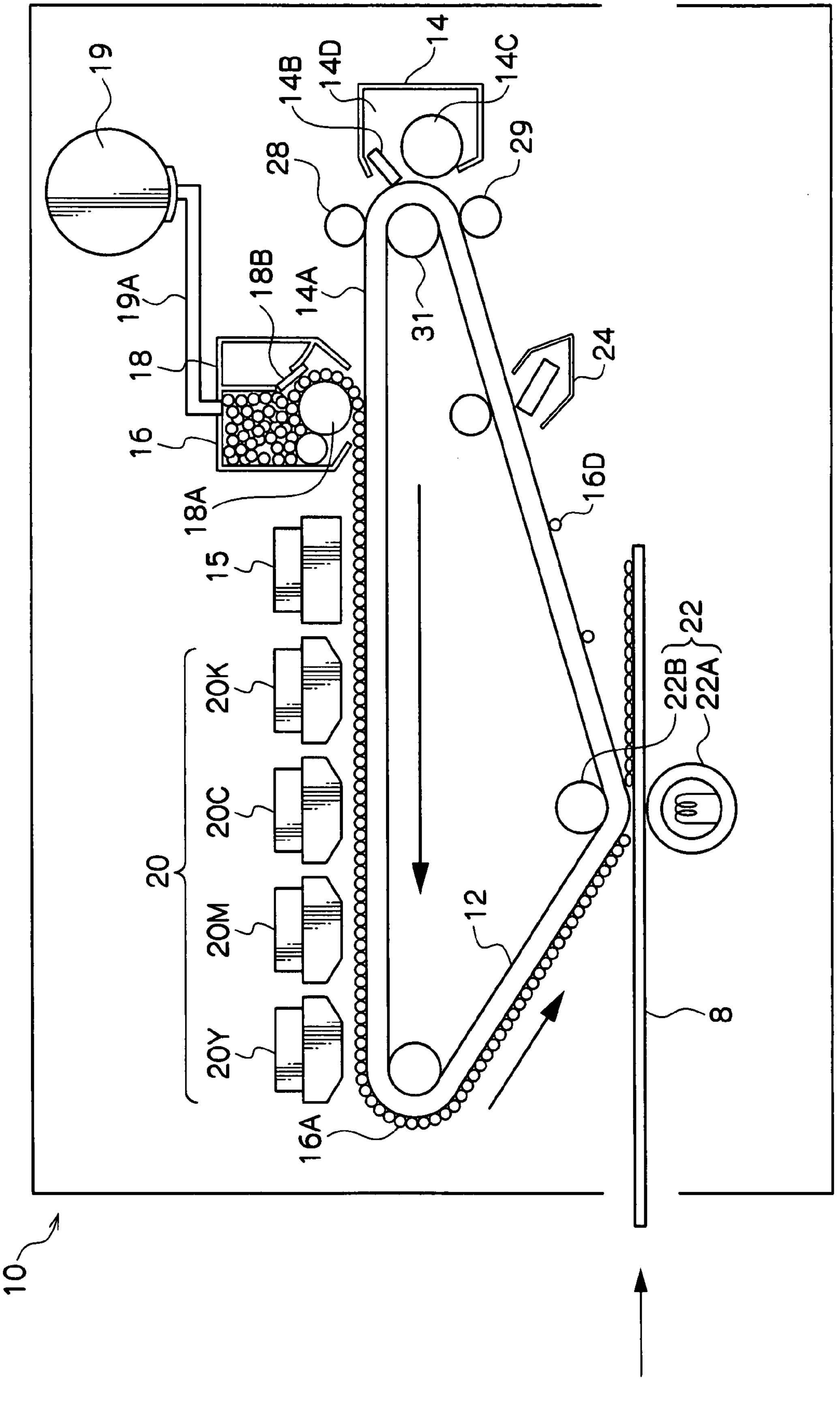
FIG. 1 is a drawing showing a recording apparatus of a first exemplary embodiment.
Figure 2:
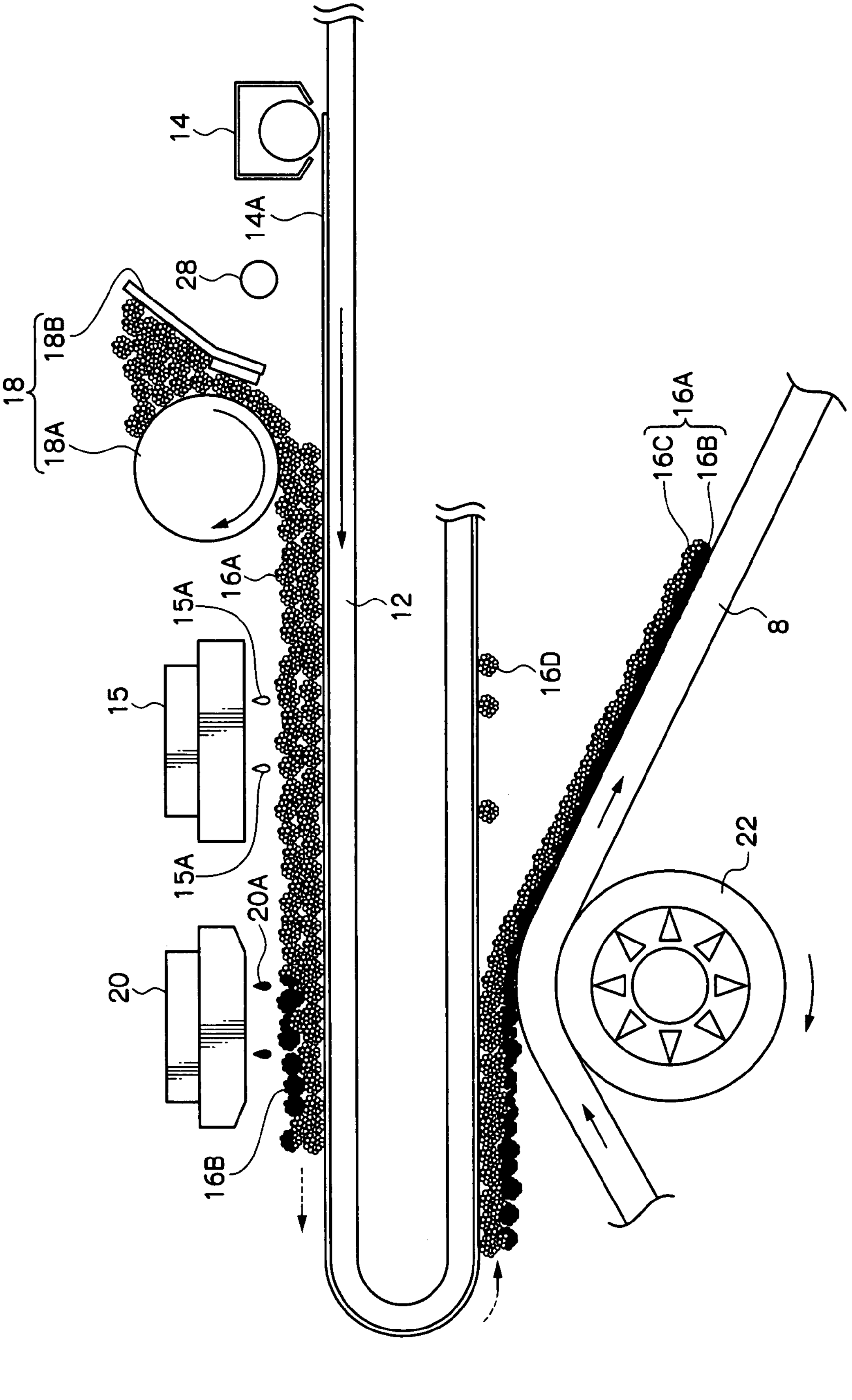
FIG. 2 is a drawing showing the main part of the recording apparatus of the first exemplary embodiment.
Figure 3A:
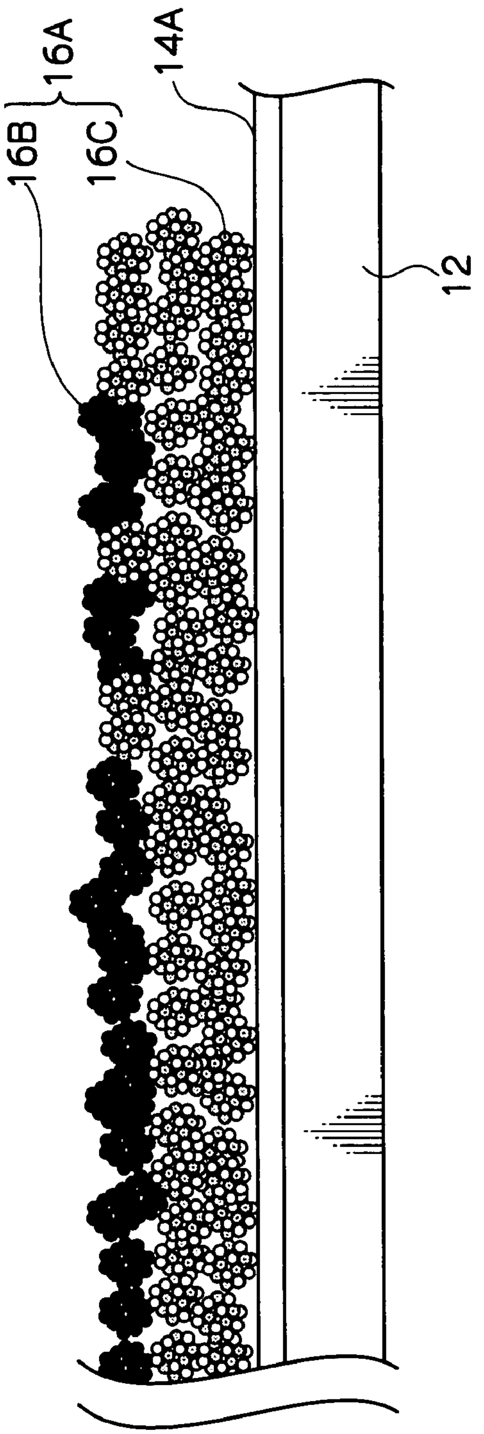
FIGS. 3A and 3B are drawings showing an ink receptive particle layer in the first exemplary embodiment.
Figure 3B:
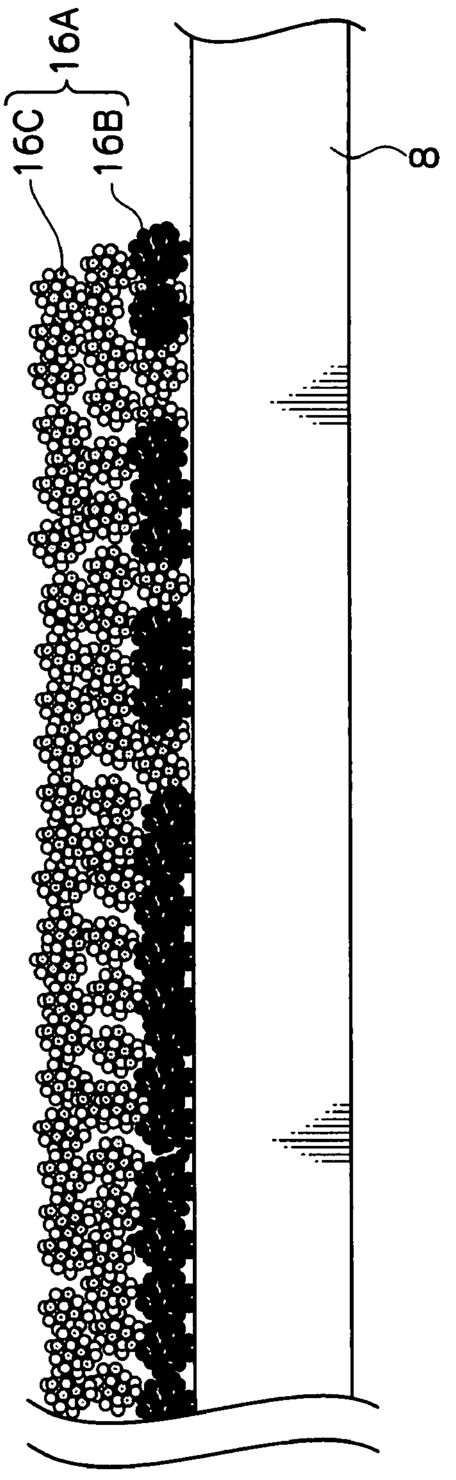

FIG. 1 is a drawing showing a recording apparatus of a first exemplary embodiment. FIG. 2 is a drawing showing the main part of the recording apparatus of the first exemplary embodiment. FIGS. 3A and 3B are drawings showing an ink receptive particle layer in the first exemplary embodiment. In the first exemplary embodiment, composite particles are used as the ink receiving particles.

As shown in FIGS. 1 and 2, a recording apparatus 10 of the first exemplary embodiment includes, for example, an intermediate transfer member 12 in the form of an endless belt, a charging unit 28 for electrically charging the surface of the intermediate transfer member 12, a particle-applying unit 18 for feeding ink receptive particles 16 to the charged region on the intermediate transfer member 12 to form a particle layer, a liquid application unit 15 for applying an alkaline or acidic liquid 15A onto the particle layer to neutralize the ink receptive particles, ink jet recording heads 20 for ejecting ink droplets onto the particle layer to form an image, and a transfer fixing unit 22 by which a recording medium 8 is laid on the intermediate transfer member 12 and pressed and heated to transfer and fix the ink receptive particle layer onto a recording medium 8. An ink receptive particle-storing cartridge 19 is connected detachably, via a feeding pipe 19A, to the particle-applying unit 18.

On the upstream side of the charging unit 28, a releasing agent-applying unit 14 for feeding a releasing agent 14D to form a releasing layer 14A is disposed.

The surface of the intermediate transfer member 12 electrically charged with the charging unit 28 is provided with a layer of the ink receptive particles 16 from the particle-applying unit 18. Ink droplets are ejected from each of the ink jet recording heads 20, that is, a black ink jet recording head 20K, a cyan ink jet recording head 20C, a magenta ink jet recording head 20M and a yellow ink jet recording head 20Y, onto the particle layer, whereby a color image is formed.

The ink receptive particle layer on which the color image layer is formed, together with the color image, is transferred onto the recording medium 8 by the transfer fixing unit (transfer fixing roll) 22. On the downstream side of the transfer fixing unit 22, a cleaning unit 24 is disposed to remove ink receptive particles 16 remaining on the intermediate transfer member and foreign matter (e.g., pieces of the recording medium 8) other than the particles.

The recording medium 8 on which the color image is transferred is conveyed, and the surface of the intermediate transfer member 12 is electrically charged again by the charging unit 28. Here, the ink receptive particles 16 transferred onto the recording medium 8 absorb and retain the ink droplets 20A, allowing the recording medium 8 to be conveyed quickly.

If necessary, a neutralization unit 29 for electrically neutralizing a residual charge on the surface of the intermediate transfer member 12 may be disposed between the cleaning unit 24 and the releasing agent-applying unit 14 (unless otherwise specified in the specification, the neutralization unit 29 is not disposed).

In the recording apparatus of the exemplary embodiment, the intermediate transfer member 12 is composed of a base layer made of polyimide film and having a thickness of 1 mm and, on the base layer, a surface layer made of ethylene propylene rubber (EPDM) and having a thickness of 400 μm. Herein, the surface resistivity of the intermediate transfer member 12 is preferably approximately $10^{13}$ ohm/□, and the volume resistivity of the intermediate transfer member is approximately $10^{12}$ ohm-cm (semi-conductivity).

The intermediate transfer member 12 is moved, and a releasing layer 14A is formed on the intermediate transfer member 12 by the releasing agent-applying unit 14. A releasing agent 14D is applied onto the intermediate transfer member 12 by the supply roller 14C of the releasing agent-applying unit 14, and the layer thickness is regulated by a blade 14B.

At this time, in order to continuously form and print images, the releasing agent-applying unit 14 may be brought into continuous contact with the intermediate transfer member 12, or may be spaced apart from the intermediate transfer member 12.

The releasing agent 14D may be supplied from an independent liquid supply system (not shown) to the releasing agent-applying unit 14, so that the supply of the releasing agent 14D is not interrupted.

Next, the charging unit 28 provides a positive charge onto the intermediate transfer member 12 to form a positive charge on the intermediate transfer member 12. A potential that enables ink receptive particles 16 to be supplied and adsorbed onto the intermediate transfer member 12 is formed by the electrostatic force of an electric field which can be formed between the supply roll 18A of the ink receptive particle-applying unit 18 and the surface of the intermediate transfer member 12.

In the exemplary embodiments, the charging unit 28 is used to apply a voltage between the charging unit 28 and a driving roll 31 (electrically connected to ground), which sandwich the intermediate transfer member 12 and to electrically charge the surface of the intermediate transfer member 12.

The charging unit 28 is a member having a roll shape and an adjusted volume resistivity of $10^6$ to $10^8$ ohm-cm. The charging unit 28 is composed of a rod made of stainless steel and, on the outer circumference of the rod, an elastic layer (foamed urethane resin layer) in which a conductive material is dispersed, and on the surface of the elastic layer, a water-repellent and oil-repellent coating layer made of, for example, tetrafluoroethylene-perfluoroalkyl vinyl ether copolymer (PFA) and having a thickness of proximately 5 to 100 μm.

A DC power source is electrically connected to the charging unit 28, and the driving roll 31 is electrically connected to a frame ground. The rotation of the charging unit 28 accompanies the rotation of the driving roll 31, with the intermediate transfer member 12 disposed therebetween. Since a specified potential difference is formed between the charging unit 28 and the grounded driving roll 31 at the pressing position, an electric charge can be applied onto the intermediate transfer member 12. Here, a voltage of 1 kV is applied onto the intermediate transfer member 12 by the charging unit 28, and the surface of the intermediate transfer member 12 is electrically charged.

The charging unit 28 may be a corotron.

Next, ink receptive particles 16 are supplied from the particle-applying unit 18 onto the intermediate transfer member 12, and an ink receptive particle layer 16A is formed. The particle applying-unit 18 has the supply roll 18A at a position facing the intermediate transfer member 12 in a container containing the ink receptive particles 16, and a charging blade 18B is disposed so as to press the supply roll 18A. The charging blade 18B also functions to regulate the layer thickness of the ink receptive particles 16 supplied to the surface of the supply roll 18A.

The ink receptive particles 16 are supplied to the supply roll 18A (conductive roll), and the thickness of the ink receptive particle layer 16A is regulated and the ink receptive particles are negatively charged, which is opposite to the polarity of the electric charge on the intermediate transfer member 12, by the charging blade 18B (conductive blade). The supply roll 18A may be an aluminum solid roll, and the charging blade 18B may be a metal plate (e.g., stainless steel plate) coated with, for example, urethane rubber in order to apply pressure. The charging blade 18B is brought into contact with the supply roll 18A in a doctor blade manner.

The charged ink receptive particles 16 form, for example, one layer of particles on the supply roll 18A and are conveyed to a position opposite to the surface of the intermediate transfer member 12. When closing to the intermediate transfer member 12, the charged ink receptive particles 16 are moved onto the intermediate transfer member 12 by the electrostatic force of an electric field formed by the potential difference between the surface of the supply roll 18A and the intermediate transfer member 12

Here, the relative ratio (peripheral speed ratio) of the moving speed of intermediate transfer member 12 and the rotating speed of the supply roll 18A are so set as to form one layer of particles on the intermediate transfer member 12. This peripheral speed ratio depends on the charging amount of the intermediate transfer member 12, the charging amount of the ink receptive particles 16, the relative position of the supply roll 18A and the intermediate transfer member 12, and other parameters.

When the peripheral speed of the supply roll 18A is relatively accelerated on the basis of the peripheral speed ratio to form one ink receptive particle layer 16A, the number of particles supplied on the intermediate transfer member 12 can be increased. When a transferred image density is low (the amount of the ink driven in is small (e.g., approximately 0.1 to approximately 1.5 g/m$^2$)), the layer thickness is regulated to a minimally required limit (e.g., approximately 1 to approximately 5 μm) When an image density is high (the amount of the ink driven in is large (e.g., approximately 4 to approximately 15 g/m$^2$)), layer thickness may be adjusted to a sufficient value (e.g., approximately 10 to approximately 25 μm) to retain the ink liquid component (i.e., a solvent or a dispersion medium).

For example, when a character image, which requires a small amount of ink driven in, is formed on a single layer of the ink receptive particles disposed on the intermediate transfer member 12, the image forming material (e.g., a pigment) in the ink is trapped near the surface of the ink receptive particle layer 16A on the intermediate transfer member 12, and is fixed on the ink receptive particle layer 16A and gap between the particles, so that the distribution of the ink is smaller in the depth direction of the ink receptive particle layer 16A.

For example, if particle layers 16C serving as a protective layer are to be formed on an image layer 16B serving as a final image (see FIG. 3A), the ink receptive particle layer 16A is so formed as to have approximately three layer thick. When an ink image is formed in the outermost layer only in this case, the remaining two layers that do not form the image can be disposed on the image layer 16B as a protective layer after transferring and fixing (see FIG. 3A).

Alternatively, when an image having a secondary or tertiary color, or an image in which the amount of ink driven in is large is formed, ink receptive particles 16 are sufficiently layered, so that the resultant particle layers can retain an ink liquid component (e.g., a solvent or a dispersion medium) and can trap a recording material (e.g., pigment) in the surface portion thereof, which means that the recording material does not reach the lowest layer. In this case, the recording material (e.g., pigment) is not exposed on the image layer surface after transferring and fixing, and ink receptive particles 16 not contributing to form the image (colored region) may be formed as a protective layer on the image.

Then, the liquid-applying unit 15 for neutralization applies liquid 15A for neutralization onto the ink receptive particle layer 16A.

Next, the ink jet recording head 20 applies ink droplets 20A to the ink receptive particle layer 16A. Based on a specified image information, the ink jet recording head 20 applies ink droplets 20A to specified positions.

Finally, the transfer fixing unit 22 nips the recording medium 8 and the intermediate transfer member 12, and applies pressure and heat to the ink receptive particle layer 16A, whereby the ink receptive particle layer 16A is transferred onto the recording medium 8.

The transfer fixing unit 22 is composed of a heating roll 22A having a heating source therein, and a pressurizing roll 22B opposite to the heating roll 22A to dispose the intermediate transfer member 12 therebetween. The heating roll 22A and the pressurizing roll 22B abut against each other to form a nip. The heating roll 22A and the pressurizing roll 22B may be formed by coating the outer surface of an aluminum core with silicone rubber and further coating the silicone rubber layer with a PFA tube.

In the nip of the heating roll 22A and the pressurizing roll 22B, the ink receptive particle layer 16A is heated by the heater and is pressurized, and hence the ink receptive layer 16A is transferred onto the recording medium 8 and fixed thereon.

At this time, organic resin particles of the ink receptive particles 16 in non-image portion are heated and softened (or fused) at a temperature higher than the glass transition point (Tg) of the organic resin particles, and the ink receptive particle layer 16A is released from the releasing layer 14A formed on the intermediate transfer member 12 by the pressure, and is transferred to the recording medium 8. Here, transfer fixing property is improved by heating. In this exemplary embodiment, the surface of heating roll 22A is controlled at 160° C. Here, the ink liquid component (e.g., a solvent or dispersion medium) retained in the ink receptive particle layer 16A is retained in the same ink receptive particle layer 16A even after transfer, and is fixed. Before the transfer fixing unit 22, preheating of the intermediate transfer member 12 may be carried out.

As the recording medium 8, either permeable media (for example, plain paper, or ink jet coated paper) or non-permeable media (for example, art paper, or resin film) may be used. The recording medium is not limited thereto, and includes other industrial products such as semiconductor substrates.

Hereinafter, the process for forming an image with the recording medium of the exemplary embodiment of the invention is described in more detail. In the recording apparatus of this exemplary embodiment, as shown in FIG. 2, a releasing layer 14A can be formed on the intermediate transfer member 12 by a releasing layer-applying unit 14. When the material of the intermediate transfer member 12 is aluminum or PET, formation of the releasing layer 14A is particularly preferable. Alternatively, fluorinated resin or silicone rubber material may be used as the material of the surface layer of the intermediate transfer member 12 in order to give releasability to the surface of the intermediate transfer member 12 itself.

Next, the surface of the intermediate transfer member 12 is electrically charged by the charging unit 28 to have polarity opposite to that of the ink receptive particles 16. As a result, the ink receptive particles 16 supplied by the supply roll 18A of the particle applying-unit 18 can be adsorbed electrostatically by the intermediate transfer member 12, and a layer of ink receptive particles 16 can be formed on the intermediate transfer member 12.

Further, a layer of ink receptive particles 16 is formed on the intermediate transfer member 12 by the supply roll 18A of the particle-applying unit 18. For example, the ink receptive particle layer 16A is formed such that the thickness thereof corresponds to substantially three layers of ink receptive particles 16. That is, the particle layer 16A is regulated to a desired thickness by the gap between the charging blade 18B and supply roll 18A, as described previously. Thus, the thickness of the ink receptive particle layer 16A transferred on the recording medium 8 is regulated. Alternatively, it may be regulated by the peripheral speed ratio of the supply roll 18A and the intermediate transfer member 12.

Then, alkaline or acidic liquid 15A for neutralization is applied onto the formed ink receptive particle layer 16A. By applying the liquid 15A for neutralization onto the ink receptive particle layer 16A, the polar groups contained in the ink receptive particles are neutralized.

That is, which of alkaline liquid 15A for neutralization and acidic liquid 15A for neutralization is to be applied is determined by the properties of the polar groups contained in the ink receptive particles. Specifically, when the polar groups contained in the ink receptive particles are anionic, the alkaline liquid 15A for neutralization is applied onto the ink receptive particle layer 16A. When the polar groups are cationic, the acidic liquid 15A for neutralization is applied onto the ink receptive particle layer 16A.

By the ink jet recording heads 20 driven in, for example, a piezoelectric or thermal manner, ink droplets 20A are ejected onto the ink receptive particle layer 16A onto which the liquid 15A for neutralization has been applied, whereby an image layer 16B is formed in the ink receptive particle layer 16A. The ink droplets 20A ejected from the ink jet recording heads 20 are driven into the ink receptive particle layer 16A, and the liquid component of the ink is rapidly absorbed into spaces among the ink receptive particles 16 and voids in the ink receptive particles 16 and simultaneously a recording material (for example, a pigment) is also trapped by the surface of (the particles of) the ink receptive particles 16 or spaces among the particles of the ink receptive particles 16.

At this time, the ink liquid component (e.g., a solvent or dispersion medium) contained in the ink droplets 20A permeates into the ink receptive particle layer 16A, however the recording material such as a pigment is trapped by the surface of the particle layer 16A or the gap between particles. That is, the ink liquid component (e.g., a solvent or dispersion medium) may permeate to the back side of the ink receptive particle layer 16A, however the recording medium, such as a pigment, does not permeate to the back side of the ink receptive particle layer 16A. Hence, when transferred onto the recording medium 8, the particle layer 16C into which the recording material, such as a pigment, has not permeated forms a layer 16C on the image layer 16B. As a result, this particle layer 16C becomes a protective layer for sealing the surface of the image layer 16B, and the image where the recording material (e.g., a coloring material, such as a pigment) is not exposed on the surface.

Next, by transferring the ink receptive particle layer 16A in which the image layer 16B is formed from the intermediate transfer member 12 to the recording medium 8 and fixing the ink receptive particle layer thereon, a color image is formed on the recording medium 8. Here, the ink receptive particle layer 16A on the intermediate transfer member 12 is heated and pressurized by the transfer fixing unit (transfer fixing rolls) 22 heated by a heating unit such as a heater, and transferred onto the recording medium 8.

At this time, by adjusting heating and pressurizing as mentioned later, the roughness of the image surface can be properly adjusted, and the degree of gloss can be controlled. Alternatively, the degree of gloss can be adjusted by cooling and peeling off.

After peeling off the ink receptive particle layer 16A, particles 16D remaining on the intermediate transfer member 12 are collected by the cleaning unit 24 (see FIG. 1), and the surface of the intermediate transfer member 12 is electrically charged again by the charging unit 28, and the ink receptive particles 16 are supplied to the intermediate transfer member 12, and the ink receptive particle layer 16A is formed on the intermediate transfer member 12.

FIG. 3 shows particle layers used in image formation in the invention. As shown in FIG. 3A, a releasing layer 14A is formed on the intermediate transfer member 12.

Next, on the intermediate transfer member 12, a layer of ink receptive particles 16 is formed by the particle-applying unit 18. As mentioned previously, the formed particle layer 16A preferably has a thickness corresponding to substantially three layers of ink receptive particles 16. By regulating the ink receptive particle layer 16A to a desired thickness, the thickness of the ink receptive particle layer 16A to be transferred onto the recording medium 8 is controlled. At this time, the ink receptive particle layer 16A has a surface that is uniform to such an extent that it does not adversely affect image formation (forming of image layer 16B) by ejection of ink droplets 20A.

The recording material, such as a pigment, contained in the ejected ink droplets 20A permeates into substantially one third to half of the ink receptive particle layer 16A, as shown in FIG. 3. A particle layer 16C into which recording material such as a pigment has not permeated remains beneath the portion that has trapped the recording material.

Since the ink receptive particle layer 16A formed on the recording medium by heating, pressurizing and transferring using the transfer fixing unit (transfer fixing rolls) 22, includes a particle layer 16C not containing ink on the image layer 16B as shown in FIG. 3B, the image layer 16B does not appear directly on the surface, and the particle layer 16C functions as a protective layer for the image layer 16B. Accordingly, the ink receptive particles 16, at least after fixing, must be transparent.

The particle layer 16C is heated and pressurized by the transfer fixing unit 22 (transfer fixing rolls), and its surface can be made smooth, and the degree of gloss of the image surface can be controlled by heating and pressurizing.

Drying of ink liquid component (e.g., a solvent or dispersion medium) trapped inside the ink receptive particles 16 may be promoted by heating.

The ink liquid component (e.g., a solvent and dispersion medium) received by the ink receptive particle layer 16A and retained therein is retained in the ink receptive particle layer 16A even after transfer fixation, and removed by natural drying.

Through the above process, the image forming is completed. If particles 16D remaining on the intermediate transfer member 12 or foreign matter such as paper dust separating from the recording medium 8 are present after transfer of ink receptive particles 16 onto the recording medium 8, they may be removed by the cleaning unit 24.

A neutralization unit 29 may be disposed on the downstream side of the cleaning unit 24. For example, using a conductive roll as the neutralizing unit 29, voltage of approximately ±3 kV and approximately 500 Hz is applied to the surface of the intermediate transfer member 12 between the conductive roll and a driven roll 31 (grounded), and the surface of the intermediate transfer member 12 can be neutralized.

The optimum conditions of the charging voltage, particle layer thickness, fixing temperature and other mechanical factors are determined depending on the composition of ink receptive particles 16 or ink, ink ejection volume, and the like. Hence each of these factors is optimized.

<Constituent Elements>

Constituent elements in the respective steps of the exemplary embodiments of the invention will be specifically described below.

<Intermediate Transfer Member>

The intermediate transfer member 12 on which the ink receptive particle layer is formed may be either a belt, which is the form in the exemplary embodiment, or hollow cylindrical (drum). To supply ink receptive particles onto the surface of the intermediate transfer member and retain the particles thereon by electrostatic force, the outer circumferential surface of the intermediate transfer member needs to have particle-retaining property of semiconductive or insulating properties. As the electric characteristics of the surface of the intermediate transfer member, a material having a surface resistivity of approximately $10^{10}$ to approximately $10^{14}$ ohm/□ and a volume resistivity of approximately $10^{9}$ to approximately $10^{13}$ ohm-cm is used in the case of semiconductive properties, and a material having a surface resistivity of approximately $10^{14}$ ohm/□ or more and a volume resistivity of approximately $10^{13}$ ohm-cm or more is used in the case of insulating properties.

In the case of a belt shape, the base material allows rotating and driving a belt in the apparatus, and has mechanical strength needed to withstand the rotating and driving and, when heat is used in transfer/fixing, heat resistance needed to withstand the heat. Specific examples of the base material include polyimide, polyamide imide, aramid resin, polyethylene terephthalate, polyester, polyether sulfone, and stainless steel.

In the case of a drum shape, the base material is, for example, aluminum or stainless steel.

In order to apply heating system by electromagnetic induction to the fixing process in the transfer fixing unit (transfer fixing rolls) 22, a heat generating layer may be formed in the intermediate transfer member 12 rather than in the transfer fixing unit (transfer fixing rolls) 22. The heat generating layer is made of a metal causing electromagnetic induction action.

For example, nickel, iron, copper, aluminum, or chromium may be used selectively as such.

<Particle Feeding Process>

By the releasing agent-applying unit 14, a releasing layer 14A of a releasing agent 14D is first formed on the intermediate transfer member 12 before feeding the ink receptive particles 16.

A method of feeding the releasing layer 14A includes a method where a releasing agent 14D is fed to a releasing agent-feeding member and is then fed from the feeding member to the surface of the intermediate transfer member 12, thereby forming a releasing layer 14A, or a method where a releasing layer 14A is formed on the intermediate transfer member 12 by a feeding member impregnated with a releasing agent 14D.

The releasing agent 14D includes releasing materials such as silicone oil, fluorinated oil, polyalkylene glycol and surfactants.

The silicone oil includes, for example, straight silicone oil and modified silicone oil.

The straight silicone oil includes, for example, dimethyl silicone oil and methyl hydrogen silicone oil.

The modified silicone oil includes, for example, methylstyryl-modified oil, alkyl-modified oil, higher fatty acid ester-modified oil, fluorine-modified oil, and amino-modified oil.

The polyalkylene glycol includes polyethylene glycol, polypropylene glycol, an alkylene oxide/propylene oxide copolymer, and polybutylene glycol. Among these, polypropylene glycol is preferable.

The surfactant includes, for example, an anionic surfactant, a cationic surfactant, an amphoteric surfactant and a nonionic surfactant. Among these, a nonionic surfactant is preferable.

The viscosity of the releasing agent 14D is preferably about 5 to about 200 mPa·s, more preferably about 5 to about 100 mPa·s, and still more preferably about 5 to about 50 mPa·s.

Measurement of the viscosity is carried out in the following manner. Using RHEOMAT 115 (manufactured by Contraves) as a measuring instrument, the viscosity of an obtained ink is measured. In this measurement, the sample is placed in a measurement vessel, which is then set in the instrument by a predetermined method. The viscosity is measured at a temperature of 40° C. at a shearing rate of 1400 $s^{-1}$.

The surface tension of the releasing agent 14D is for example in the range of up to about 40 mN/m (preferably up to about 30 mN/m, and more preferably up to about 25 mN/m).

Measurement of the surface tension is carried out in the following manner. Using a WILLHERMY-type surface tension meter (manufactured by Kyowa Interface Science Co., Ltd.), the surface tension of an obtained sample is measured in an atmosphere of 23±0.5° C. and 55±5% RH.

For example, the boiling point of the releasing agent 14D is in the range of about 250° C. or more (preferably about 300° C. or more, and more preferably about 350° C. or more) at 760 mmHg.

Measurement of the boiling point is carried out in the following manner. The measurement is conducted according to JIS K2254, and initial boiling point is used as the boiling point.

By the charging unit 28, the surface of the intermediate transfer member 12 is then electrically charged to have polarity opposite to that of the ink receptive particles 16. Then, an ink receptive particle layer 16A is formed on the electrically charged intermediate transfer member 12. Here, a method which involves feeding a general electrophotographic toner to a photoreceptor can be applied to a method of forming an ink receptive particle layer 16A. That is, the surface of the intermediate transfer member 12 is electrically charged by a method of a general electrographic charging (for example, charging with the charging unit 28). The ink receptive particles 16 are frictionally charged (by a one- or two-component frictional charging system) to have polarity opposite to that of the charge of the surface of the intermediate transfer member 12.

Ink receptive particles 16 held on the supply roll 18A, together with the surface of the intermediate transfer member 12, form an electric field and are moved/supplied onto the intermediate transfer member 12 and held thereon by electrostatic force. At this time, depending on the thickness of an image layer 16B to be formed in the particle layer 16A (depending on the amount of ink to be applied), the thickness of the ink receptive particle layer 16A can be controlled. At this time, the absolute value of the charging amount of the ink receptive particles 16 is preferably in the range of about 5 μc/g to about 50 μc/g.

The thickness of the ink receptive particle layer 16A is preferably about 1 to about 100 μm, more preferably about 1 to about 50 μm, and still more preferably about 5 to about 25 μm. The percentage of void of the ink receptive particle layer (that is, the percentage of void among the ink receptive particles + that in the ink receptive particles (trapping structure)) is preferably about 10 to about 80%, more preferably about 30 to about 70%, and still more preferably about 40 to about 60%.

A particle supply process corresponding to one-component supply (development) system will be explained below.

The ink receptive particles 16 are supplied onto a supply roll 18A, and charged by a charging blade 18B while the thickness of the particle layer is regulated.

The charging blade 18B has a function of regulating the layer thickness of the ink receptive particles 16 on the supply roll 18A, and can change the layer thickness of the ink receptive particles 16 on the supply roll 18A by varying pressure applied to the supply roll 18A. By controlling the layer thickness of the ink receptive particles 16 on the supply roll 18A to, for example, one layer thickness, the layer thickness of the ink receptive particles 16 formed on the intermediate transfer member 12 is controlled to one layer thickness. By controlling the pressing force of the charging blade 18B to a low value, the layer thickness of the ink receptive particles 16 formed on the supply roll 18A can be increased, and the thickness of the layer of the ink receptive particles formed on the intermediate transfer member 12 can be increased.

In other methods, when the peripheral speed ratio of the intermediate transfer member 12 to the supply roll 18A forming, for example, one particle layer on the intermediate transfer member 12 is 1, the number of ink receptive particles 16 supplied onto the intermediate transfer member 12 can be increased and the thickness of particle layer 16A on the intermediate transfer member 12 can be increased by increasing the peripheral speed of the supply roll 18A. The layer thickness can also be regulated by combining the above methods. In this configuration, for example, the ink receptive particles 16 are charged negatively, and the surface of the intermediate transfer member 12 is charged positively.

By thus controlling the thickness of the ink receptive particle layer 16A, consumption of ink receptive particle layer 16A can be suppressed, and a pattern whose surface is covered with a protective layer may be formed.

As the charging roll in the charging unit 28, it is possible to use a roll including bar or pipe member which is made of, for example, aluminum or stainless steel and, on the outer surface of the bar or pipe member, an elastic layer in which a conductive material is dispersed and having a controlled volume resistivity of approximately $10^6$ to approximately $10^8$ ohm-cm and a diameter of approximately 10 to approximately 25 mm in diameter.

The elastic layer includes resin material, such as urethane resin, thermoplastic elastomer, epichlorohydrine rubber, ethylene-propylene-diene copolymer rubber, silicone rubber, acrylonitrile-butadiene copolymer rubber, or polynorbornene rubber. One of these resin materials may be used alone or a mixture of two or more of these resin materials may be used. The elastic layer is preferably made of a foamed urethane resin.

The foamed urethane resin is preferably a resin having closed cell structure formed by mixing and dispersing a hollow body such as hollow glass beads or microcapsules of thermal expansion type in a urethane resin.

Further, the surface of elastic layer may be coated with a water repellent skin layer of about 5 to about 100 μm in thickness.

A DC power source is electrically connected to the charging unit 28, and a driven roll 31 is electrically connected to a frame ground. The charging unit 28 is driven while the intermediate transfer member 12 is placed between the charging unit 28 and the driven roll 31. At the pressing position, a specified potential difference is generated between the charging unit 28 and the grounded driven roll 31.

<Neutralization Process>

By the liquid-applying unit 15 for neutralization, the liquid 15A for neutralization is applied onto the surface of a layer (ink receptive particle layer 16A) of the ink receptive particles 16 formed on the intermediate transfer member 12, thereby neutralizing polar groups contained in the ink receptive particles. By the liquid-applying unit 15 for neutralization, the liquid 15A for neutralization may be applied onto the whole surface (both a non-image portion and an image portion) of the ink receptive particle layer 16A. Alternatively, the liquid 15A for neutralization may be onto only a region to be an image portion according to image signals, similarly to the ink jet recording heads 20.

The term "neutralization" refers to the dissociation of the polar groups by neutralization reaction (acid-base reaction).

The liquid 15A for neutralization includes alkali and acid aqueous solutions. As described previously, when the polar groups contained in the ink receptive particles are anionic (for example, when the polar groups are carboxylic acid groups, or sulfonic acid groups), an alkali aqueous solution is used. When the polar groups are cationic (for example, when the polar groups are amino groups, or ammonium groups), an acid aqueous solution is used.

The alkali aqueous solution used as the liquid 15A for neutralization includes, for example, aqueous solutions containing alkalis such as alkali metal hydroxides (for example, sodium hydroxide, potassium hydroxide, or lithium hydroxide), and organic cation-containing compounds (for example, tetraalkyl ammonium, alkylamine, benzalkonium, alkylpyridium, imidazolium, polyamine and derivatives and salts thereof, specifically amylamine, butylamine, propanolamine, propylamine, ethanolamine, ethylethanolamine, 2-ethylhexylamine, triethanolamine, ethylmethylamine, ethylenediamine, and octylamine).

The pH of the alkali aqueous solution is preferably about 8 or more, more preferably about 8 to about 14, and still more preferably about 9 to about 13. The alkali concentration is preferably such that the pH of the resulting alkali aqueous solution is in the range mentioned above.

The acid aqueous solution used as the liquid 15A for neutralization includes, for example, aqueous solutions containing inorganic acids (for example, hydrochloric acid, sulfuric acid, nitric acid, and/or phosphoric acid) and organic acids (for example, citric acid, glycinic acid, glutamic acid, succinic acid, tartaric acid, phthalic acid, pyrrolidonecarboxylic acid, pyronecarboxylic acid, pyrrolecarboxylic acid, furancarboxylic acid, pyridinecarboxylic acid, coumaric acid, thiophenecarboxylic acid, nicotinic acid, and/or derivatives of these compounds, and salts thereof, preferably pyrrolidonecarboxylic acid, pyronecarboxylic acid, pyrrolecarboxylic acid, furancarboxylic acid, pyridinecarboxylic acid, coumaric acid, thiophenecarboxylic acid, and nicotinic acid).

The pH of the acid aqueous solution is preferably about 6 or less, more preferably about 1 to about 6, and still more preferably about 2 to about 5. The acid concentration is preferably such that the pH of the resulting acid aqueous solution is in the range mentioned above.

The pH of the liquid for neutralization is measured in an ordinary atmosphere (of 23±0.5° C. and 55±5% RH) by a pH conductivity meter MPC227 (manufactured by Mettler-Toledo K.K.).

The surface tension of the liquid 15A for neutralization is preferably about 20 to about 35 mN/m, more preferably about 25 to about 35 mN/m, and still more preferably about 25 to about 33 mN/m. The surface tension used herein is a value determined in an atmosphere of 23° C. and 55% RH by using the WILLHERMY type surface tension meter (manufactured by Kyowa Interface Science Co., Ltd.).

The amount of the liquid 15A for neutralization, applied by the liquid-applying unit 15 for neutralization, is preferably about 0.25 to about 5 $g/m^2$, more preferably about 0.3 to about 2.5 $g/m^2$, and still more preferably about 0.5 to about 2.0 $g/m^2$.

When attention is focused on the amount of the ink receptive particles, the amount of the liquid 15A for neutralization is preferably such that the mass ratio thereof to the amount of the ink receptive particles per unit area is about 1 to about 30%. The mass ratio is more preferably about 0.1 to about 25%, and still more preferably about 1 to about 20%. The amount of the ink receptive particles per unit area refers to the amount of the particles per unit area of the surface onto which the particles are applied.

The liquid 15A for neutralization is applied preferably in such an amount that the molar ratio of $[OH^-]$ or $[H^+]$ to the polar group in the ink receptive particles is about 1.5% or less.

The liquid-applying unit 15 for neutralization may be a device that ejects and applies the liquid 15 for neutralization onto the ink receptive particle layer 16A in an ink jet manner, an ultrasonic wave manner or a spray manner, or may be a device for applying (coating) the liquid 15 for neutralization onto the ink receptive particle layer 16A in a roller coating manner. In this exemplary embodiment, a device that is in an ink jet manner (ink jet recording head) and is driven by a piezoelectric or thermal process is used as the liquid-applying unit 15 for neutralization.

<Marking Process>

On the basis of image signals, ink droplets 20A are ejected from the ink jet recording heads 20 to a layer (ink receptive particle layer 16A) of the ink receptive particles 16 that is formed on the intermediate transfer member 12 and onto which the liquid 15A for neutralization has been applied, to form an image. The ink droplets 20A ejected from the ink jet recording heads 20 are driven into the ink receptive particle layer 16A, and the ink droplets 20A are rapidly absorbed into gaps (spaces) formed among primary particles of the ink receptive particles 16, and a recording material (for example, a pigment) is captured (trapped) onto the surfaces of the ink receptive particles 16 or into spaces among the particles of the ink receptive particles 16.

In this case, a large amount of the recording material (for example, a pigment) is preferably captured (trapped) onto the surface of the ink receptive particle layer 16A. The gaps (spaces) among the primary particles of the ink receptive particles 16 exhibit a filtering effect, and this effect is exhibited by trapping the recording material (for example, a pigment) onto the surface of the ink receptive particle layer 16A and simultaneously trapping and fixing the recording material into the gaps among the ink receptive particles 16.

To securely trap the recording material (e.g., a pigment) on the surface of the ink receptive particle layer 16A and into the gaps between the primary particles of the ink receptive particles 16, the ink may react with the ink receptive particles 16, and hence, the recording material (e.g., a pigment) may be quickly made insoluble (aggregated). Specifically, this reaction may be realized by making use of reaction between ink and polyhydric metal salt, or pH reaction-type materials.

Although the recording head used is preferably a line-type ink jet recording head having a width equal to or greater than the width of a recording medium, a conventional scanning ink jet recording head can be used to form an image sequentially on the particle layer formed on the intermediate transfer member. The ink-ejecting unit in each of the ink jet recording heads 20 is not particularly limited as far as it is a unit capable of jetting an ink, for example, a device driven by a piezoelectric element or a heater element. The ink used can be an ink containing a conventional dye as a colorant, but is preferably a pigment ink.

When the ink receptive particles 16 react with the ink, the ink receptive particles 16 are treated with an aqueous solution containing a coagulant (e.g., a polyvalent metal salt or an organic acid) which has an effect of reacting with the ink to coagulate the pigment, and dried before use.

<Transfer Process>

The ink receptive particle layer 16A in which an image is formed by receiving ink drops 20A is transferred to and fixed on a recording medium 8, and therefore, an image is formed on the recording medium 8. The transfer and fixing may be done in separate processes. However the transfer and fixing is preferably done at substantially the same time. The fixing may be effected by any one of heating and pressing methods of the ink receptive particle layer 16A, or by using both method of heating and pressing methods, and is preferably conducted by heating and pressing at substantially the same time.

By regulating heating/pressurization, the surface physical properties of the ink receptive particle layer 16A, such as gloss (degree of gloss), can be regulated. When the recording medium 8 onto which the image (ink receptive particle layer 16A) has been transferred is released from the intermediate transfer member 12 after heating/pressurization, the recording medium may be released after cooling of the ink receptive particle layer 16A. The cooling method can be natural cooling or forced cooling such as air cooling. For such process, the intermediate transfer member 12 is preferably belt-shaped.

Preferably, the ink image is formed in the surface part of the ink receptive particle 16 layer formed on the intermediate transfer member 12 (the recording material (pigment) is trapped onto the surface of the ink receptive particle layer 16A) and transferred onto the recording medium 8, thereby forming an ink image that is protected by a particle layer 16C of the ink receptive particles 16.

The ink liquid component (e.g., a solvent or dispersion medium) received by and retained in the ink receptive particle 16 layer is retained in the ink receptive particle 16 layer even after the transfer and fixation and is removed by natural drying.

<Cleaning Process>

To allow repetitive use by refreshing the surface of the intermediate transfer member 12, a process of cleaning the surface by a cleaning unit 24 is needed. The cleaning unit 24 includes a cleaning part and a particle conveying and recovery part (not shown), and by the cleaning process, the ink receptive particles 16 (residual particles 16D) remaining on the intermediate transfer member 12, and deposits sticking to the surface of the intermediate transfer member 12 such as foreign matter (e.g., paper dust of recording medium 8) other than the particles can be removed. The collected residual particles 16D may be recycled.

<Neutralization Process>

Before formation of a releasing layer 14A, the surface of the intermediate transfer member 12 may be neutralized with the neutralization unit 29.

In the recording apparatus in this exemplary embodiment, a releasing agent 14D is supplied from the releasing agent-applying unit 14 to the surface of the intermediate transfer member 12 to form a releasing layer 14A, and then the surface of the intermediate transfer member is electrically charged by the charging unit 28. Subsequently, ink receptive particles 16 are supplied from the particle-applying unit 18 to the region of the intermediate transfer member 12 where the releasing layer is formed and electrically charged so as to form a particle layer thereon. By the liquid-applying unit 15 for neutralization, a liquid 15A for neutralization is applied onto the particle layer to neutralize the polar groups of the ink receptive particles 16. Thereafter, by the ink jet recording heads 20, ink droplets are ejected onto the particle layer to form an image thereon. The ink is thereby received by the ink receptive particles 16. Then, a recording medium 8 is laid on the intermediate transfer member 12 and then pressurized and heated by the transfer fixing unit 22, thereby transferring and fixing the ink receptive particle layer onto the recording medium 8.

Second Exemplary Embodiment

Figure 4:
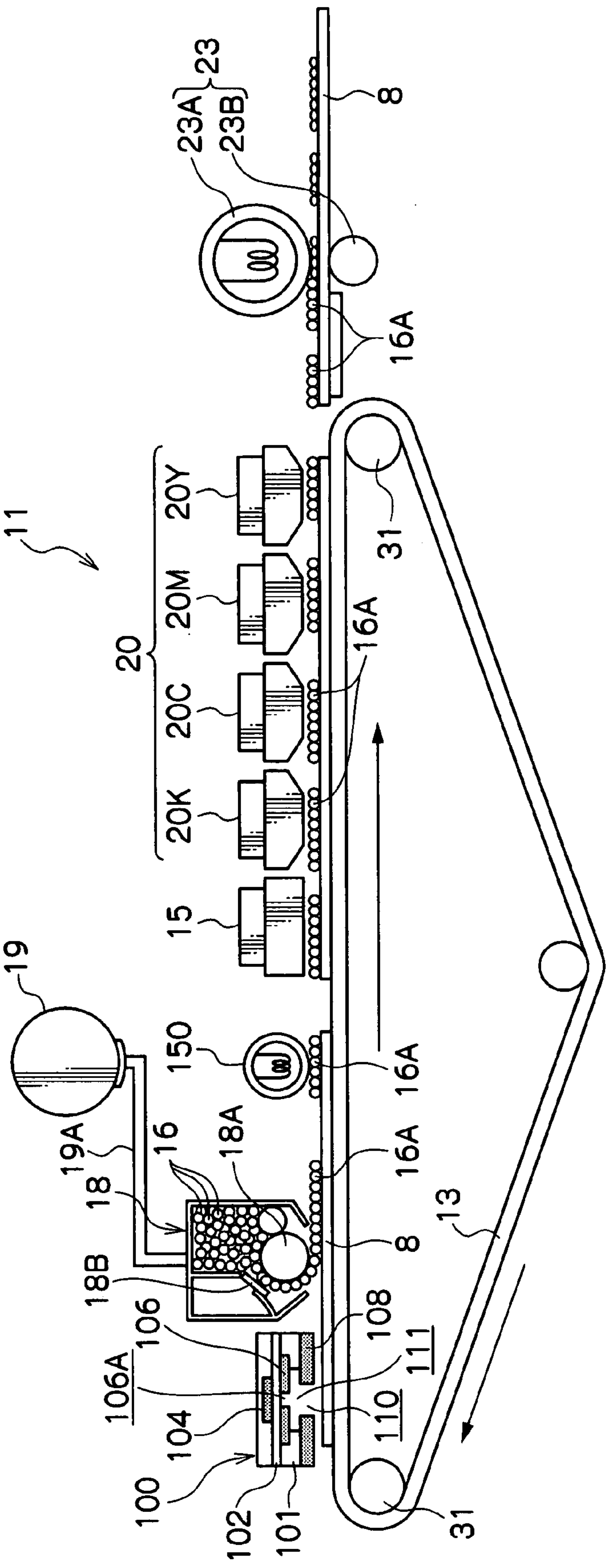
FIG. 4 is a drawing showing a recording apparatus of a second exemplary embodiment.
Figure 5:
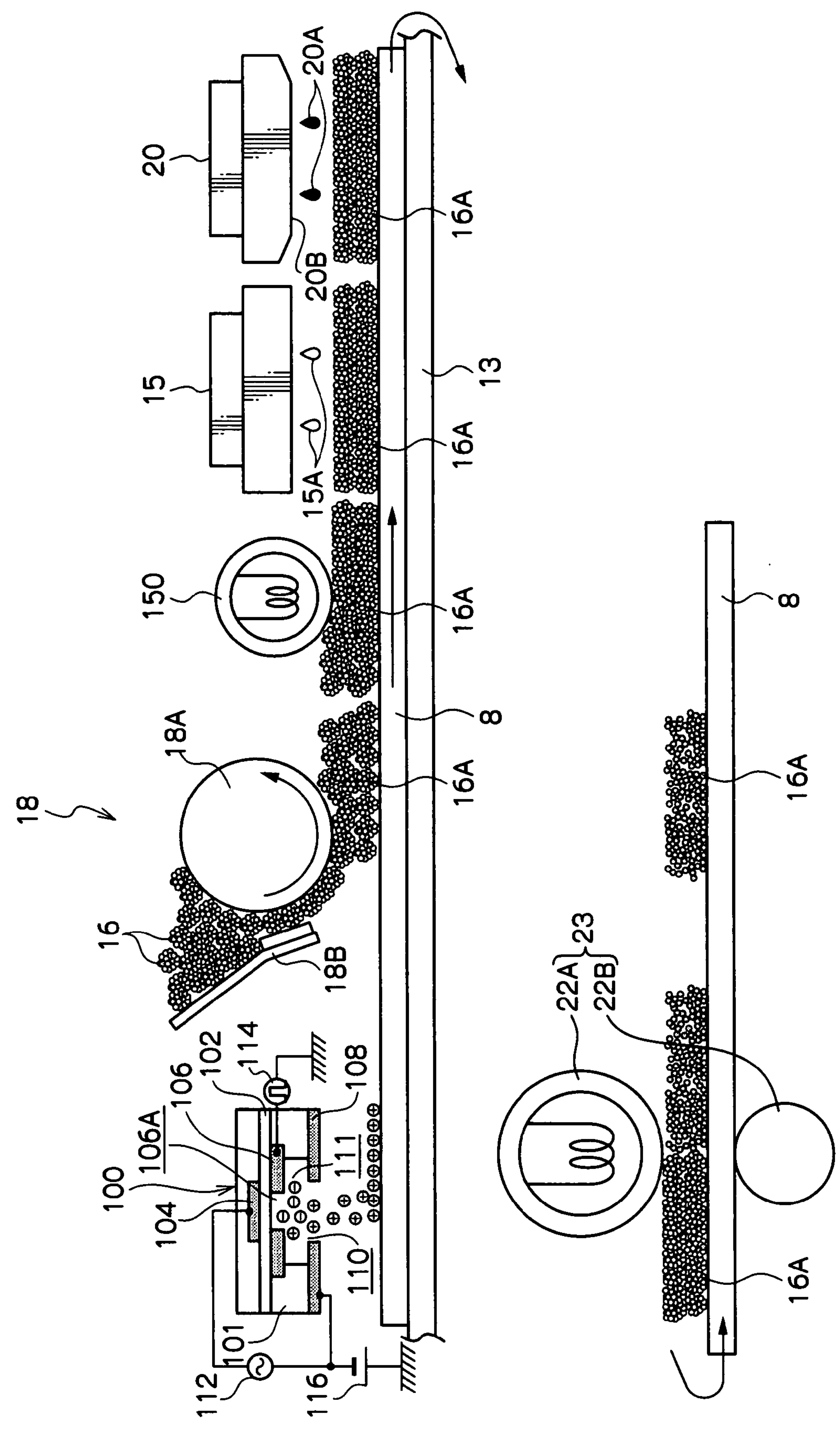
FIG. 5 is a drawing showing the main part of the recording apparatus of the second exemplary embodiment.

FIG. 4 is a drawing showing a recording apparatus according to a second exemplary embodiment. FIG. 5 is a drawing showing the main part of the recording apparatus according to the second exemplary embodiment. In the second exemplary embodiment shown below, composite particles are used as ink receptive particles described later.

As shown in FIGS. 4 and 5, the recording apparatus 11 in the second exemplary embodiment has a conveying belt 13 in the form of an endless belt. The conveying belt 13 is rotated and moved to convey a recording medium 8 sent from a container (not shown).

By an ion stream control electrostatic recording head 100 (abbreviated hereinafter as "electrostatic recording head 100"), an ion stream by discharging is controlled and applied onto the recording medium 8 conveyed by the conveying belt 13, thereby forming an electrostatic latent image (see FIG. 6A).

Figures 6A, 6B, 6C:
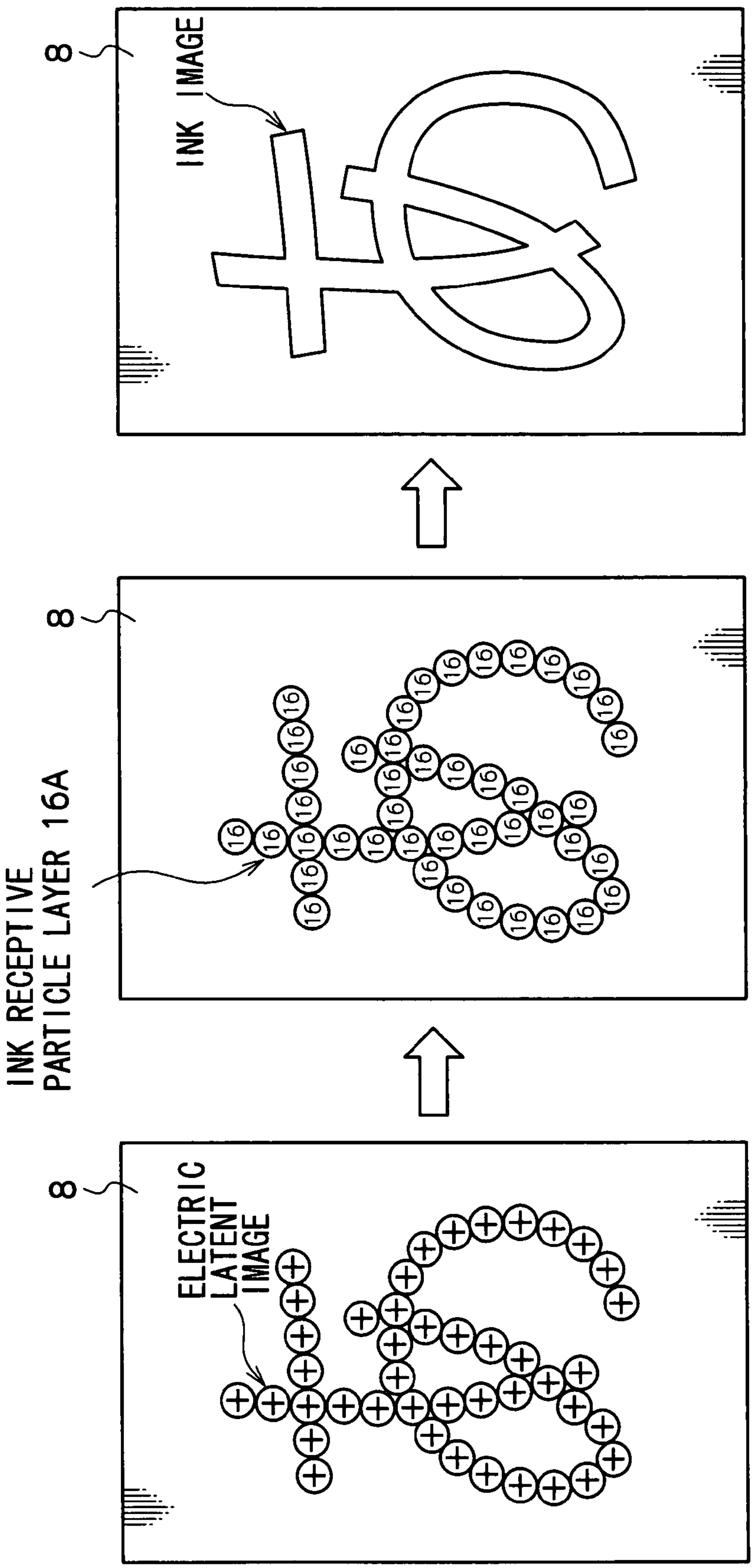
FIGS. 6A to 6C are conceptual drawings showing a process for forming an image in the recording apparatus of the second exemplary embodiment.

The electrostatic latent image formed on the recording medium 8 is made visible by an ink receptive particle-applying unit 18 to form an ink receptive particle layer 16A composed of the ink receptive particles 16 (see FIG. 6B).

The ink receptive particle layer 16A formed on the recording medium 8 is preliminarily thermally fixed with a preliminary fixing unit 150.

A liquid 15A for neutralization is applied from a liquid-applying unit 15 for neutralization onto the preliminarily thermally fixed ink receptive particle layer 16A. From ink jet recording heads 20K, 20C, 20M and 20Y for the respective colors black (K), cyan (C), magenta (M) and yellow (Y), ink droplets 20A of the respective colors (see FIG. 5) are ejected on the basis of image data to form an ink image (see FIG. 6C). If the respective colors should be distinguished, Y, M, C and K are given after symbol, but if particular distinction is unnecessary, the indication of Y, M, C and K is omitted.

The ink receptive particle layer 16A on which the ink image has been formed by ejecting ink droplets 20A is pressurized and heated with a fixing unit 23, thereby fixing the ink image on the recording medium 8.

Each of the electrostatic recording head 100 and the ink jet recording heads 20 is a line-type recording head whose width is equal to or greater than the width of the recording medium 8, that is, a recording head of an FWA (full width array) system.

Hereinafter, the respective constituent elements and a process for forming an image will be described in detail.

A recording medium 8 is conveyed with the conveying belt 13 in the form of an endless belt. In this exemplary embodiment, the recording medium 8 is conveyed while the medium sticks fast to the conveying belt 13.

By way of example, a unit of sticking the recording medium 8 to the conveying belt 13 includes a sucking mechanism wherein the conveying belt 13 is provided with holes (not shown) through which the recording medium is sucked. Another unit of sticking the recording medium 8 to the conveying belt 13 may be a unit of sticking by adhesive power or a unit of electrostatically sticking the recording medium 8 to the conveying belt 13.

On the upstream side in the conveying direction, the electrostatic recording head 100 for forming an electrostatic latent image on the recording medium 8 conveyed with the conveying belt 13 is provided above the recording medium 8, with a gap disposed therebetween.

In the electrostatic recording head 100, plural driving electrodes 104 are disposed in parallel with one another on the surface of an insulating substrate 102 having a plan shape that is rectangular. Moreover, plural control electrodes 106 are disposed in the backside of the insulating substrate so that the control electrodes intersect with the driving electrodes 104 in the plan view. In other words, the driving electrodes 104 and the control electrodes 106 form a matrix (lattice) in the plan view. In the control electrodes 106, circular openings 106A are formed in positions where they intersect with the driving electrodes 104 in the plan view. On the lower surface of the control electrodes 106, screen electrodes 108 are disposed via an insulating substrate 101. In the insulating substrate 101 and the screen electrodes 108, a space 111 and openings 110 for leading out ions are formed in positions corresponding to the openings 106A of the control electrodes 106.

By an AC source 112, high-frequency high voltage is applied between the driving electrodes and the screen electrodes 108. By an ion control power source 114, pulse voltage corresponding to image information is applied to the control electrodes 106. By a DC source 116, DC voltage is also applied to the screen electrodes 108.

An alternating electric field is thus applied between the insulated driving electrodes 104 and control electrodes 106, whereby creeping corona discharge is induced in the space 111. Ions generated by this creeping corona discharge are accelerated or absorbed by an electric field formed between the control electrodes 106 and the screen electrodes 108, release of an ion stream from the openings 110 for leading out ions is controlled, and by ions (plus ions in this exemplary embodiment) corresponding to image signals (ink image), an electrostatic latent image (see FIG. 6A) is formed on the recording medium 8.

The potential of the electrostatic latent image may be potential by which the ink receptive particles 16 can be supplied and adsorbed into the recording medium 8 with electrostatic force due to an electric field formed between the particle supply roll 18A of the ink receptive particle-applying unit 18 and the electrostatic latent image formed on the recording medium 8.

The electrostatic recording head 100 enables selection of a region on which an electrostatic latent image is formed. Accordingly, the electrostatic latent image formed on the recording medium 8 is a region on which an ink image is to be formed. For example, FIG. 6A is a conceptual diagram showing formation of a first Japanese Hiragana character as an image to be formed.

The recording medium 8 having an electrostatic latent image formed thereon is sent to the ink receptive particle-applying unit 18 where the electrostatic latent image is made visible to form an ink receptive particle layer 16A corresponding to the electrostatic latent image (see FIG. 6B). The ink receptive particle layer 16A is formed only on the region of the recording medium 8 in which region an ink image is to be formed, according to image signals (ink receptive particle layer 16A is hardly formed on a non-image portion).

Now, the description is returned to the image forming process.

The ink receptive particle layer 16A formed on the recording medium 8 is preliminarily fixed with a preliminarily fixing unit 150.

The ink receptive particle layer 16A formed on the recording medium 8 is fixed, with electrostatic force, to the recording medium 8. Accordingly, when ink droplets 20A are driven, in the next step from the ink jet recording heads 20, into the ink receptive particle layer 16A unfixed, the ink receptive particle layer 16A may be disordered depending on the amount of the ink. To avoid this, by preliminarily fixing the ink receptive particle layer 16A in advance, the ink receptive particles 16 are temporarily fixed to the surface of the recording medium 8.

The preliminary fixation can prevent the ink receptive particles 16 from scattering upon driving the ink droplets 20A into the particles, thus preventing contamination of the nozzle faces 20B of the ink jet recording heads 20.

The temperature of preliminary heating in the preliminarily fixing unit 150 is lower than that of heating for final fixing in the fixing unit 23. That is, preliminary fixation in the preliminarily fixing unit 150 may be such that resin particles in the ink receptive particles 16 are fused each other and bonded to the surface of the recording medium, with gaps remaining among the ink receptive particles. In other words, the resin particles are not completely melted, and not pressurized, and not completely fixed on the recording medium. The ink receptive particles are preliminarily fixed to such an extent as to be able to receive ink droplets 20A.

The preliminarily fixing unit 150 can use a general heating fuser used in an electrophotographic image forming apparatus. Further, a heater system, oven system, or electromagnetic induction heating system can also be used as well as the heating fuser used in an electrophotographic image forming apparatus.

Then, the recording medium having the ink receptive particle layer 16A preliminarily fixed thereon is conveyed under the liquid-applying unit 15 for neutralization. A liquid 15A for neutralization is applied from the liquid-applying unit 15 for neutralization onto the ink receptive particle layer 16. Details concerning the liquid-applying unit 15 for neutralization and the liquid 15A for neutralization are the same as in the first exemplary embodiment.

The recording medium 8 onto which the liquid 15A for neutralization has been applied is conveyed under the ink jet recording heads 20.

On the basis of image data, ink droplets 20A are ejected from the ink jet recording heads 20 and driven into the ink receptive particle layer 16A formed on the recording medium 8 to form an ink image (FIG. 6C). At this time, the ink is received by the ink receptive particles 16.

To record an image at a high speed, it is preferable to use a line-type ink jet recording head whose width is equal to or greater than the width of a recording medium, as in this exemplary embodiment. However, a scanning ink jet recording head may be used to sequentially form an image. The ink-ejecting unit of each of the ink jet recording heads 20 is not limited as far as it can jet an ink. For example, a device driven by a piezoelectric element or a heater element is used as such.

Next, the recording medium 8 is released from the conveying belt 13 and sent to the fixing unit 23, and the ink receptive particle layer 16A is pressurized and heated, whereby the ink receptive particle layer 16A is fixed to the recording medium 8.

The fixing unit 23 is composed of a heating source-containing heating roll 23A and a pressure roll 23B that are opposite to each other, and the heating roll 23A and pressure roll 23B are brought into contact with each other to form a contact portion. The heating roll 23A and pressure roll 23B used are, for example, those having an aluminum core, and, on the outer surface of the aluminum core, a silicone rubber coating and a PFA tube in this order. The fixing unit has substantially the same configuration as the fuser used in an electrophotographic image forming apparatus. Further, a heater system, oven system, or electromagnetic induction heating system can also be used as well as the heating fuser used in an electrophotographic image forming apparatus.

When the recording medium 8 passes through the contact portion between the heating roll 23A and the pressure roll 23B, the ink receptive particle layer 16A is heated and pressurized to fix the ink receptive particle layer 16A onto the recording medium 8. The fixing may be conducted by a method using either heating or pressurization rather than a method using both heating and pressurization. However, using both heating and pressurization is preferable.

Through the process described above, image formation is finished, and the recording medium 8 is discharged from the apparatus.

In the recording apparatus in the exemplary embodiment described above, while a recording medium is being conveyed with the conveying belt 13, an electrostatic latent image is formed by the electrostatic recording head 100, and ink receptive particles 16 are supplied from the particle-applying unit 18 to the electrostatic latent image, thereby forming a particle layer. By the liquid-applying unit 15 for neutralization, a liquid 15A for neutralization is applied onto the particle layer to neutralize the polar groups of the ink receptive particles 16, and by the ink jet recording heads 20, ink droplets are ejected onto the particle layer to form an image. The ink receptive particles 16 thereby receive the ink. Then, the recording medium 8 is released from the conveying belt 13 and pressurized and heated with the fixing unit 23, thereby fixing the ink receptive particle layer onto the recording medium 8. Features not described above are the same as in the first exemplary embodiment, so their descriptions are omitted.

The ink receptive particles used in the exemplary embodiments described above will be described in detail. In the following descriptions, symbols are omitted.

The ink receptive particles receive ink components upon contacting with an ink. Here, the term "ink receptive" indicates retaining at least a part of ink components (at least the liquid component). The ink receptive particles include at least an organic resin in which the ratio of at least one polar group-containing polar monomer to all the monomers is about 10 mol % to about 90 mol %. Specifically, the ink receptive particles include particles (hydrophilic organic particles) containing the organic resin (hereinafter, particles containing the hydrophilic organic particles are referred to as "host particles".).

Here, the ink receptive particles being hydrophilic means that these particles contain at least an organic resin whose monomers include at least one polar monomer containing a polar group and in which the ratio of the at least one polar monomer to all the monomers is about 10 mol % to about 90 mol %. These ink receptive particles have higher viscosity than hydrophobic particles.

Each of the ink receptive particles may be or have a host particle composed of a hydrophilic organic particle alone (primary particle) or may be or have a host particle that is a composite particle having at least hydrophilic organic particles.

When the ink receptive particles each of which is a host particle composed of a hydrophilic organic particle alone (primary particle) receive an ink, the ink adheres to the ink receptive particles and at least the liquid component of the ink is absorbed by the hydrophilic organic particles.

Thus, the ink receptive particles receive the ink. The ink receptive particles receiving the ink are transferred onto a recording medium to conduct recording.

When the ink receptive particles each of which is one host particle or composite particle composed of at least hydrophilic organic particles receive an ink, the ink first adheres to the ink receptive particles, and at least the liquid component of the ink is captured (trapped) into gaps among the particles (at least hydrophilic organic particles) of the composite particles (the gaps (spaces) among the particles are referred to as a trapping structure in some cases). At this time, the recording material in the ink component adheres to the surfaces of the ink receptive particles or is captured (trapped) by the trapping structure. In this way, the ink receptive particles receive the ink. Then, the ink receptive particles that have received the ink are transferred onto a recording medium, thereby effecting recording.

Trapping of the ink liquid component into this trapping structure is physical and/or chemical trapping into gaps (physical particle wall structure) among the particles.

By using host particles that are composite particles each composed of at least hydrophilic organic particles, the ink liquid component is absorbed by and retained in the hydrophilic organic particles in addition to trapping into gaps (physical particle wall structure) among the particles of the composite particles.

After the ink receptive particles are transferred to a recording medium, the component of the hydrophilic organic particles of the ink receptive particles also function as a binder resin or coating resin for the recording material contained in the ink. Further, when the ink receptive particles are composite particles, the recording material is trapped into their trapping structure. In particular, a transparent resin is preferably used as the component of the hydrophilic organic particles of the ink receptive particles.

To improve the fixing property (rub-resistance) of ink (for example, a pigment ink) using an insoluble component or dispersed granular matter such as a pigment as the recording material, a large amount of resin must be added to the ink. However, when a large amount of polymer is added to the ink (including its processing liquid), the nozzle of an ink discharging unit may clog and the reliability may lower. In contrast, the organic resin component of the ink receptive particles may function as the above resin.

The "gaps among the particles of the composite particles", that is, "trapping structure" is a physical particle wall structure capable of trapping at least a liquid. The size of this gap, in terms of maximum diameter, is preferably about 0.1 to about 5 μm, and more preferably about 0.3 to about 1 μm. The gap particularly preferably has such a size as to trap, for example, pigment particles having a volume average particle diameter of about 100 nm. Fine pores having a maximum diameter of less than about 50 nm may also be present. The gaps and capillaries are preferably those communicating with one another inside the particles.

The gap size can be determined by reading a scanning electron microscopic (SEM) image of a particle surface by an image analyzer, detecting gaps by binary coding process, and analyzing the size and distribution of the gaps.

It is preferable that the trapping structure traps not only the liquid component from the ink components but also the recording material. When the recording material, in particular, a pigment, is trapped in the trapping structure as well as the ink liquid components, the recording material is retained and fixed within the ink receptive particles without localization. The ink liquid component is mainly an ink solvent or dispersion medium (vehicle liquid).

Hereinafter, the ink receptive particles will be described in more detail. As described previously, each of the ink receptive particles may have a host particle composed of a hydrophilic organic particle alone (primary particle), or may have a host particle composed of composite particles each having at least hydrophilic organic particles. Particles other than the hydrophilic organic particles of the composite particles include inorganic particles and porous particles. The host particles may be composed of composite particles having plural hydrophilic organic particles only. The particles allowed to adhere to the surfaces of the host particles include, for example, inorganic particles in addition to hydrophobic organic particles.

Figure 7:
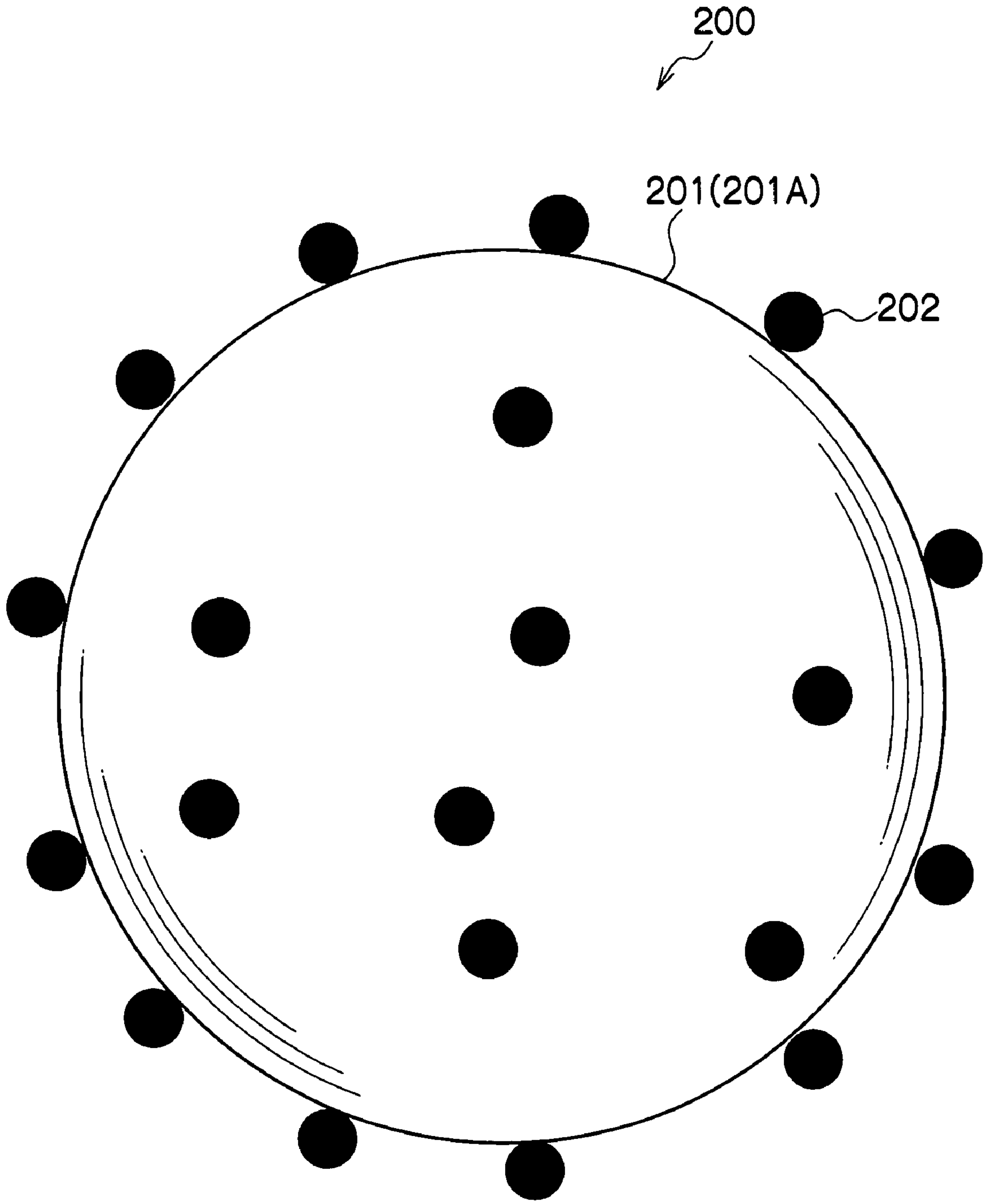
FIG. 7 is a conceptual drawing showing one example of ink receptive particles in exemplary embodiments.
Figure 8:
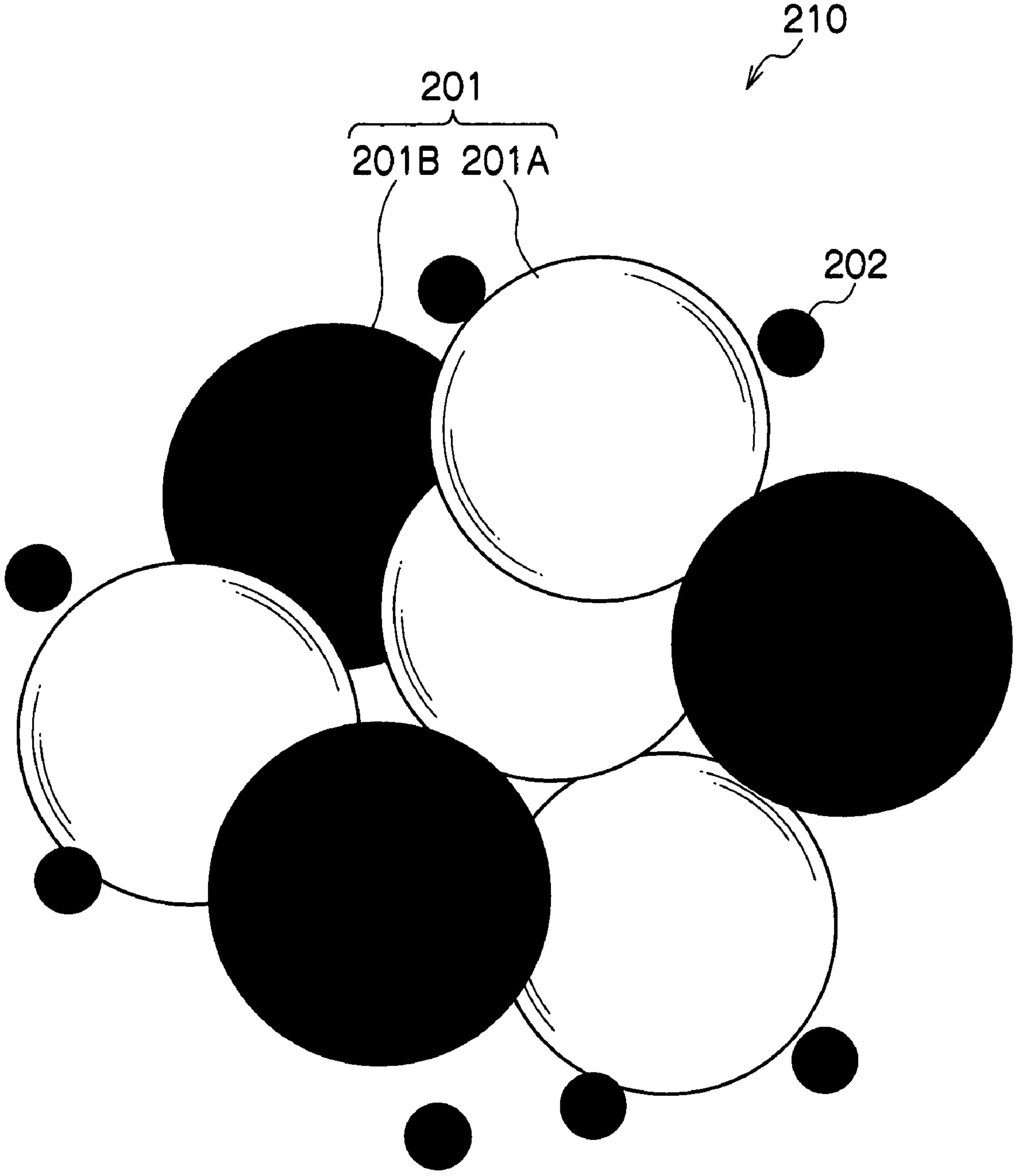
FIG. 8 is a conceptual drawing showing another example of ink receptive particles in the exemplary embodiments.

As for the specific structure of the ink receptive particles, each of the ink receptive particles 200 may have a host particle 201 composed of a hydrophilic organic particle 201A alone (primary particle) and inorganic particles 202 adhering to the host particle 201, as shown in FIG. 7. Alternatively, as shown in FIG. 8, each of the ink receptive particles 210 may have a host particle 201 that is a composite particle composed of hydrophilic organic particles 201A and inorganic particles 201B, and inorganic fine particles 202 adhering to the host particles 201 and serving as an external additive. The host particles that are the composite particles have a gap structure formed by gaps among the particles.

When the host particles are composite particles, the mass ratio of the hydrophilic organic particles to other particles (hydrophobic organic particles/other particles) is in the range of about 5/1 to about 1/10 in the case that other particles are inorganic particles.

The particle diameter of the host particles, in terms of sphere-equivalent average particle diameter, is for example in the range of about 0.1 to about 50 μm (preferably about 0.5 to about 25 μm, and more preferably about 1 to about 10 μm).

When the host particles are composite particles, the BET specific surface area ($N_2$) thereof is, for example, in the range of about 1 to about 750 $m^2/g$.

When the host particles are composite particles, the composite particles are obtained for example by granulating the componential particles in a semi-sintered state. The semi-sintered state refers to a state in which the shapes of particles remain at a certain degree and in which gaps are kept among the particles. When the ink liquid component is trapped into the trapping structure, at least a part of the composite particles may be dissociated, that is, the composite particles may be broken down to allow the particles thereof to be discrete.

Then, the hydrophilic organic particles will be described. Preferably, the hydrophilic organic particles include, for example, an organic resin in which the ratio of at least one polar monomer to all the monomers is about 10 mol % to about 90 mol %, preferably about 15 mol % to about 85 mol %, and more preferably about 30 mol % to about 80 mol %. Specifically, the hydrophilic organic particles preferably contain an organic resin having a ratio of polar monomer(s) to all the monomers being within the ratio mentioned above (referred to hereinafter as water absorbing resin).

The polar monomer is a monomer containing as a polar group an ethylene oxide group, a carboxylic acid group, a sulfonic acid group, a substituted or unsubstituted amino group, a hydroxyl group, an ammonium group or a salt thereof. In the case of a positive charging property, for example, the polar monomer is preferably a (substituted) amino group, an ammonium group, a (substituted) pyridine group or an amine salt thereof, or a monomer of a salt-forming structure such as a quaternary ammonium salt. In the case of a negative charging property, the polar group is preferably a monomer having a structure of an organic acid (salt) such as carboxylic acid (salt) or sulfonic acid (salt). Thus, the polar monomer may contain an anionic polar group (for example, a carboxylic acid group, or a sulfonic acid group) or a cationic polar group (for example, an amino group or an ammonium group).

In this specification, the proportion of the polar monomer(s) can be determined in the following manner. First, the composition of the organic components is specified by analysis techniques such as mass spectroscopy, NMR, or IR. Thereafter, the acid value or base value of the organic components is determined according to JIS K0070 or JIS K2501. From the composition and acid value/base value of the organic component, the proportion of the polar monomer(s) can be obtained by calculation.

The hydrophilic organic particles are composed of, for example, a liquid-absorbing resin. Because the absorbed ink liquid component (for example, an aqueous solvent) acts as a plasticizer for the resin (polymer), the resin can thus soften to contribute to fixability of the ink.

The liquid-absorbing resin is preferably a resin weakly absorbing liquid. For example, when water is absorbed as the liquid, this resin weakly absorbing liquid means a lyophilic resin capable of absorbing water in an amount of several % (about 5%) to several hundreds % (about 500%), preferably about 5 to about 150%, based on the mass of the resin.

The liquid-absorbing resin can be composed of, for example, a homopolymer of a hydrophilic monomer or a copolymer composed of both hydrophilic and hydrophobic monomers, but a copolymer is preferable as a resin weakly absorbing water. A graft copolymer or block copolymer having a unit of polymer/oligomer structure copolymerized with another unit can also be used.

Examples of the hydrophilic monomer include monomers including —OH, -EO unit (ethylene oxide group), —COOM wherein M is, for example, a hydrogen, an alkaline metal such as Na, Li, or K, an ammonia, or an organic amine, —$SO_3M$ (M is, for example, a hydrogen, an alkaline metal such as Na, Li, or K, an ammonia, or an organic amine), —$NR_3$ wherein R is, for example, H, an alkyl group, or a phenyl group, $NR_4X$ wherein R is, for example, H, an alkyl group, or a phenyl group, and X is a halogen, a sulfate radical, acidic anions such as a carboxylic acid, or $BF_4$. Specific examples of the hydrophilic monomer include 2-hydroxyethyl methacrylate, 2-hydroxyethyl acrylate, acrylamide, acrylic acid, methacrylic acid, unsaturated carboxylic acid, crotonic acid, and maleic acid. Examples of a hydrophilic unit or monomer include cellulose derivatives such as cellulose, ethyl cellulose, carboxymethyl cellulose; starch derivatives; monosaccharides and polysaccharides; vinyl sulfonic acid and styrene sulfonic acid; polymerizable carboxylic acids such as acrylic acid, methacrylic acid, (anhydrous) maleic acid and (partially) neutralized salts thereof; vinyl alcohols; derivatives such as vinyl pyrrolidone, vinyl pyridine, amino(meth)acrylate and dimethylamino(meth)acrylate, and onium salts thereof; amides such as acrylamide, isopropyl and acrylamide; vinyl compounds containing at least one polyethylene oxide chain; vinyl compounds containing at least one hydroxyl group; polyesters obtained by reacting multifunctional carboxylic acid and polyhydric alcohol, especially branched polyesters having, as a component, tri- or higher functional acids such as trimellitic acid and containing, at the end portion(s), carboxylic acid and/or plural hydroxyl groups, and polyester having at least one polyethylene glycol structure.

The hydrophobic monomers are monomers having at least one hydrophobic group, and specific examples thereof include olefin (e.g., ethylene, and butadiene), styrene, α-methylstyrene, α-ethylstyrene, methyl methacrylate, ethyl methacrylate, butyl methacrylate, acrylonitrile, vinyl acetate, methyl acrylate, ethyl acrylate, butyl acrylate, and lauryl methacrylate. Examples of a hydrophobic unit or monomer include styrene derivatives such as styrene, αa-methylstyrene, vinyl toluene; vinylcyclohexane, vinylnaphthalene, vinylnaphthalene derivatives, alkyl acrylate, phenyl acrylate, alkyl methacrylate, phenyl methacrylate, cycloalkyl methacrylate, alkyl crotonate, dialkyl itaconate, and dialkyl maleate; and derivatives thereof.

Specific examples of the liquid-absorbing resin that is a copolymer of the hydrophilic monomer and the hydrophobic monomer include olefin polymers (or modified products thereof, or products into which a carboxylic acid unit is introduced by copolymerization) such as (meth)acrylate copolymer, styrene/(meth)acrylate/(an hydrous) maleic acid copolymer, ethylene/propylene copolymer, branched polyesters having acid value enhanced by trimellitic acid, and polyamides.

Preferably, the liquid-absorbing resin has a structure of neutralized salt (for example, carboxylic acid salt). The neutralized salt structure such as carboxylic acid salt can form an ionomer, when ink containing a cation (for example, a monovalent metal cation such as Na, or Li) is absorbed. This is due to interaction between the cation and the polar group (for example, the carboxylic acid group) of the resin.

Preferably, the liquid-absorbing resin contains a substituted or unsubstituted amino group, or a substituted or unsubstituted pyridine group. Such a group has a bactericidal effect or interaction with a recording material having an anion group (for example, a pigment or a dye).

In the liquid-absorbing resin, the molar ratio (hydrophilic monomer: hydrophobic monomer) of hydrophilic unit (hydrophilic monomer) to hydrophobic unit (hydrophobic monomer) is preferably about 5:95 to about 70:30.

The absorbing resin may be ion-crosslinked with ions supplied from an ink. Specifically, the water absorbing resin can allow carboxylic acid-containing units such as copolymers containing carboxylic acids such as (meth)acrylic acid or maleic acid or (branched) polyesters having carboxylic acid to be present in the resin. Ion crosslinkage and acid-base interaction occur due to the carboxylic acid in the resin and alkali metal cations, alkaline earth metal cations, organic amine or onium cations supplied from the liquid such as aqueous ink.

Common characteristics of the liquid-absorbing resin and the liquid-unabsorbing resin of hydrophobic organic particles (hereinafter referred to collectively as organic resin) will be described.

The liquid-absorbing resin may have a linear structure, but preferably has a branched structure. The liquid-absorbing resin is preferably non-crosslinked or crosslinked at a low level. The liquid-absorbing resin may be a random or block copolymer having a linear structure, but a polymer having a branched structure (including a random copolymer, block copolymer and graft copolymer having a branched structure) can be used more preferably. For example, when polyester synthesized through polycondensation has a branched structure, it can increase terminal groups. Synthesis of this branched structure by adding a crosslinking agent such as divinyl benzene or di(meth)acrylate (in an amount of, for example, less than 1%) at the time of synthesis or by adding a large amount of an initiator together with a crosslinking agent is one of general techniques.

At least one charge control agent for electrophotographic toner, for example, a salt-forming compound such as a low-molecular-weight quaternary ammonium salt, an organic borate and a salicylic acid derivative may be added to the liquid-absorbing resin. Addition of conductive (the term "conductive" means, for example, a volume resistance of less than about $10^7$ Ω·cm. Hereinafter, this definition applies unless otherwise specified) and semi-conductive (the term "semi-conductive" means, for example, a volume resistance of less than about $10^7$ to about $10^{13}$ Ω·cm unless otherwise specified) inorganic substances such as tin oxide and titanium oxide is effective for regulation of electric conductivity of the liquid-absorbing resin.

The liquid-absorbing resin is preferably an amorphous resin, and its glass transition temperature (Tg) is, for example, about 40 to about 90° C. The glass transition temperature (and melting point) is determined from the major maximum peak measured in accordance with ASTM D 3418-8. The major maximum peak can be measured by using DSC-7 (manufactured by Perkin Elmer). In this apparatus, temperature of detection unit is corrected by melting points of indium and zinc, and the calorimetric value is corrected by using fusion heat of indium. For the sample, an aluminum pan is used. For the control, an empty pan is set. Measurement is carried out at a programming rate of 10° C./min.

The weight-average molecular weight of the liquid-absorbing resin is, for example, about 3,000 to about 300,000. The weight-average molecular weight is measured under the following conditions. For example, the GPC apparatus used is HLC-8120GPC, SC-8020 (manufactured by TOSOH CORPORATION). As the column(s), two pieces of TSK gel, SuperHM-H (manufactured by TOSOH CORPORATION, 6.0 mm ID×15 cm) are used. The eluent is THF (tetrahydrofuran). The experiment can be carried out under the following conditions: a sample concentration of 0.5%, flow velocity of 0.6 ml/min, sample injection amount of 10 μl, measuring temperature of 40° C. IR detector is used in the experiment. A calibration curve is prepared from ten samples of polystyrene standard samples TSK standards manufactured by TOSOH CORPORATION, A-500, F-1, F-10, F-80, F-380, A-2500, F-4, F-40, F-128 and F-700.

The acid value of the liquid-absorbing resin may be 50 to 777 mg KOH/g as expressed by carboxylic acid groups (—COOH). The acid value as expressed by carboxylic acid groups (—COOH) can be measured as follows.

The acid value is measured by a neutralization titration method in accordance with JIS K 0070 (the disclosure of which is incorporated herein by reference). That is, a proper amount of sample is prepared. To this sample, 100 ml of solvent (diethyl ether/ethanol mixture) is added together with several droplets of indicator (phenolphthalein solution). Then, the resulting mixture is stirred and mixed sufficiently in a water bath until the sample is dissolved completely. The solution is titrated with 0.1 mol/L of potassium hydroxide ethanol solution. An end point is determined when a pale scarlet color of indicator continues for 30 seconds. Acid value A is calculated by the following equation:

$$A=(B\times f\times 5.611)/S$$

In the above formula, A represents acid value, S is the sample amount (g), B is the amount (ml) of 0.1 mol/L of potassium hydroxide ethanol solution used in titration, and f is the factor of 0.1 mol/L of potassium hydroxide ethanol solution.

The liquid-absorbing resin described above, regardless of whichever form it has, has a regulated proportion of the polar monomer in the range defined previously and is used.

The particle diameter of the hydrophilic organic particles, when their primary particles are host particles, is, for example, in the range of about 0.1 to about 50 μm (preferably about 0.5 μm to about 25 μm, and more preferably about 1 μm to about 10 μm) in terms of sphere-equivalent average particle diameter. On the other hand, the particle diameter of the hydrophilic organic particles that are composite particles is, for example, in the range of about 10 nm to about 30 μm (preferably about 50 nm to about 10 μm, and more preferably about 0.1 μm to about 5 μm) in terms of sphere-equivalent average particle diameter.

For example, the proportion of the hydrophilic organic particles to the whole of the ink receptive particles, in terms of mass ratio, is, for example, 75% or more, more preferably 85% or more, and still more preferably 90 to 99%.

Then, inorganic particles that, together with the hydrophilic organic particles, form the composite particles, and inorganic particles allowed to adhere to the host particles, will be described. As the inorganic particles, either non-porous or porous particles can be used. The inorganic particles include colorless, pale or while particles (for example, colloidal silica, alumina, calcium carbonate, zinc oxide, titanium oxide, or tin oxide). These inorganic particles may be subjected to surface treatment (e.g., partial hydrophobilization treatment, treatment for introduction of specific functional group). In the case of silica, hydroxyl groups of silica are treated with a silylating agent such as trimethyl chlorosilane, t-butyldimethyl chlorosilane, thereby introducing alkyl groups thereto. By the silylating agent, the reaction proceeds with removal of hydrochloric acid. In this case, when amine is added to the system, hydrochloric acid can be converted into hydrochloride to promote the reaction. The reaction can be controlled by regulating treatment conditions and the amount of a silane coupling agent having an alkyl or phenyl group as hydrophobic group or a titanate or zirconate coupling agent. Further, aliphatic alcohols or higher fatty acids or derivatives thereof can also be used in surface treatment. Coupling agents having a cationic functional group, such as silane coupling agents having a (substituted) amino group or a quaternary ammonium salt structure, coupling agents having a fluorinated functional group, for example fluorosilane, and coupling agents having an anionic functional group, for example carboxylic acid can also be used in surface treatment. These inorganic particles may be contained in the inside of the hydrophilic organic particles, that is, these may be internally added.

The particle diameter of the inorganic particles of the composite particles, in terms of sphere-equivalent average particle diameter, is for example in the range of about 10 nm to about 30 μm (preferably about 50 nm to about 10 μm, and more preferably about 0.1 μm to about 5 μm). On the other hand, the particle diameter of the inorganic particles allowed to adhere to the host particles, in terms of sphere-equivalent average particle diameter, is for example in the range of about 10 nm to about 1 μm (preferably about 10 nm to about 0.1 μm, and more preferably about 10 nm to about 0.05 μm).

Then, other additives for the ink receptive particles will be described. First, the ink receptive particles preferably contain a component for aggregating or thickening ink components.

The component having such function may be contained as functional groups of the resin of the liquid-absorbing resin particles, (resin in the water-absorbing resin). Examples of such functional group include carboxylic acid, polyvalent metal cations, and polyamine.

Typical examples of such a compound include aggregating agents such as inorganic electrolyte, organic acid, inorganic acid, and organic amine.

Examples of the inorganic electrolyte include alkali metal ions such as a lithium ion, a sodium ion, a potassium ion, polyvalent metal ions such as an aluminum ion, a barium ion, a calcium ion, a copper ion, an iron ion, a magnesium ion, a manganese ion, a nickel ion, a tin ion, a titanium ion and a zinc ion, hydrochloric acid, hydrobromic acid, hydriodic acid, sulfuric acid, nitric acid, phosphoric acid, thiocyanic acid, and an organic carboxylic acid such as acetic acid, oxalic acid, lacetic acid, fumaric acid, citric acid, salicylic acid and benzoic acid, and organic sulfonic acid salts.

Specific examples of the inorganic electrolyte include an alkali metal salt such as lithium chloride, sodium chloride, potassium chloride, sodium bromide, potassium bromide, sodium iodide, potassium iodide, sodium sulfate, potassium nitrate, sodium acetate, potassium oxalate, sodium citrate, and potassium benzoate, and a polyvalent metal salt such as aluminum chloride, aluminum bromide, aluminum sulfate, aluminum nitrate, aluminum sodium sulfate, aluminum potassium sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogenphosphate, calcium thiocyanate, calcium benzoate, calcium acetate, calcium salicylate, calcium tartrate, calcium lactate, calcium fumarate, calcium citrate, copper chloride, copper bromide, copper sulfate, copper nitrate, copper acetate, iron chloride, iron bromide, ion iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate, and zinc acetate.

Examples of the organic acid include arginine acid, citric acid, glycine, glutamic acid, succinic acid, tartaric acid, cysteine, oxalic acid, fumaric acid, phthalic acid, maleic acid, malonic acid, lycine, malic acid, compounds represented by Formula (1), and derivatives of the compounds.

Formula (1)

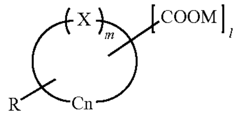

In Formula (1), X represents O, CO, NH, $NR_1$, S or $SO_2$. $R_1$ represents an alkyl group and $R_1$ is preferably $CH_3$, $C_2H_5$ and $C_2H_4OH$. R represents an alkyl group and R is preferably $CH_3$, $C_2H_5$ and $C_2H_4OH$. R may be or may not be included in the Formula. X is preferably CO, NH, NR and O, and more preferably CO, NH and O. M represents a hydrogen atom, an alkali metal or amine. M is preferably H, Li, Na, K, monoethanolamine, diethanolamine or triethanolamine, is more preferably H, Na, and K, and is still more preferably a hydrogen atom. n represents an integer of 3 to 7. n is preferably such a number that a heterocyclic ring is a six-membered ring or five-membered ring, and is more preferably such a number that the heterocyclic ring is a five-membered ring. m represents 1 or 2. The compound represented by Formula (1) may be a saturated ring or an unsaturated ring when the compound is a hetero ring. l represents an integer of 1 to 5.

The compound represented by Formula (1) is, for example, a compound having any of furan, pyrrole, pyrroline, pyrrolidone, pyrone, pyrrole, thiophene, indole, pyridine, and quinoline structures, and having at least one carboxyl group as a functional group. Specific examples of the compound include 2-pyrrolidone-5-carboxylic acid, 4-methyl-4-pentanolide-3-carboxylic acid, furan carboxylic acid, 2-benzofuran carboxylic acid, 5-methyl-2-furan carboxylic acid, 2,5-dimethyl-3-furan carboxylic acid, 2,5-furan dicarboxylic acid, 4-butanolido-3-carboxylic acid, 3-hydroxy-4-pyrone-2,6-dicarboxylic acid, 2-pyrone-6-carboxylic acid, 4-pyrone-2-carboxylic acid, 5-hydroxy-4-pyrone-5-carboxylic acid, 4-pyrone-2,6-dicarboxylic acid, 3-hydroxy-4-pyrone-2,6-dicarboxylic acid, thiophene carboxylic acid, 2-pyrrole carboxylic acid, 2,3-dimethylpyrrole-4-carboxylic acid, 2,4,5-trimethylpyrrole-3-propionic acid, 3-hydroxy-2-indole carboxylic acid, 2,5-dioxo-4-methyl-3-pyrroline-3-propionic acid, 2-pyrrolidine carboxylic acid, 4-hydroxyproline, 1-methylpyrrolidine-2-carboxylic acid, 5-carboxy-1-methylpyrrolidine-2-acetic acid, 2-pyridine carboxylic acid, 3-pyridine carboxylic acid, 4-pyridine carboxylic acid, pyridine dicarboxylic acid, pyridine tricarboxylic acid, pyridine pentacarboxylic acid, 1,2,5,6-tetrahydro-1-methylnicotinic acid, 2-quinoline carboxylic acid, 4-quinoline carboxylic acid, 2-phenyl-4-quinoline carboxylic acid, 4-hydroxy-2-quinoline carboxylic acid, and 6-methoxy-4-quinoline carboxylic acid.

Preferred examples of the organic acid include citric acid, glycine, glutamic acid, succinic acid, tartaric acid, phthalic acid, pyrrolidone carboxylic acid, pyrone carboxylic acid, pyrrole carboxylic acid, furan carboxylic acid, pyridine carboxylic acid, coumarinic acid, thiophene carboxylic acid, nicotinic acid, and derivatives and salts thereof. The organic acid is more preferably pyrrolidone carboxylic acid, pyrone carboxylic acid, pyrrole carboxylic acid, furan carboxylic acid, pyridine carboxylic acid, coumarinic acid, thiophene carboxylic acid, nicotinic acid, and derivatives and salts thereof. The organic acid is still more preferably pyrrolidone carboxylic acid, pyrone carboxylic acid, furan carboxylic acid, coumarinic acid, and derivatives and salts thereof.

The organic amine compound may be any of primary amine, secondary amine, tertiary amine, quaternary amine or a salt thereof. Examples of the organic amine compound include a tetraalkyl ammonium, alkylamine, benzalconium, alkylpyridium, imidazolium, polyamine and derivatives and salts thereof. Specific examples of the organic amine include amyl amine, butyl amine, propanol amine, propyl amine, ethanol amine, ethyl ethanol amine, 2-ethylhexyl amine, ethyl methyl amine, ethyl benzyl amine, ethylene diamine, octyl amine, oleyl amine, cyclooctyl amine, cyclobutyl amine, cyclopropyl amine, cyclohexyl amine, diisopropanol amine, diethanol amine, diethyl amine, di-2-ethylhexyl amine, diethylene triamine, diphenyl amine, dibutyl amine, dipropyl amine, dihexyl amine, dipentyl amine, 3-(dimethyl amino)propyl amine, dimethyl ethyl amine, dimethyl ethylene diamine, dimethyl octyl amine, 1,3-dimethyl butyl amine, dimethyl-1,3-propane diamine, dimethyl hexyl amine, amino butanol, amino propanol, amino propanediol, N-acetylaminoethanol, 2-(2-aminoethylamino)-ethanol, 2-amino-2-ethyl-1,3-propanediol, 2-(2-aminoethoxy)ethanol, 2-(3,4-dimethoxyphenyl)ethyl amine, cetyl amine, triisopropanol amine, triisopentyl amine, triethanol amine, trioctyl amine, trityl amine, bis(2-aminoethyl)1,3-propanediamine, bis(3-aminopropyl)ethylene diamine, bis (3-aminopropyl)1,3-propanediamine, bis(3-amino propyl) methyl amine, bis(2-ethylhexyl)amine, bis(trimethylsilyl) amine, butyl amine, butyl isopropyl amine, propane diamine, propyl diamine, hexyl amine, pentyl amine, 2-methyl-cyclohexyl amine, methyl-propyl amine, methyl benzyl amine, monoethanol amine, lauryl amine, nonyl amine, trimethyl amine, triethyl amine, dimethyl propyl amine, propylene diamine, hexamethylene diamine, tetraethylene pentamine, diethyl ethanol amine, tetramethyl ammonium chloride, tetraethyl ammonium bromide, dihydroxyethyl stearyl amine, 2-heptadecenyl-hydroxyethyl imidazoline, lauryl dimethyl benzyl ammonium chloride, cetylpyridinium chloride, stearamid methylpyridium chloride, a diallyl dimethyl ammonium chloride polymer, a diallyl amine polymer, and a monoallyl amine polymer.

The organic amine compound is more preferably triethanol amine, triisopropanol amine, 2-amino-2-ethyl-1,3-propanediol, ethanol amine, propane diamine, and/or propyl amine.

Among these aggregating agents, polyvalent metal salts, such as $Ca(NO_3)$, $Mg(NO_3)$, $Al(OH_3)$, a polyaluminum chloride are preferable.

One of the aggregating agents may be used alone or two or more kinds of the aggregating agents may be mixed and used. The content of the aggregating agent(s) is preferably about 0.01% by weight to about 30% by weight, more preferably about 0.1% by weight to about 15% by weight, and still more preferably about 1% by weight to about 15% by weight.

Preferably, a releasing agent is contained in the ink receptive particles in the invention. The releasing agent may be contained in the liquid-absorbing resin, or releasing agent particles and the hydrophilic organic resin particles are contained in the composite particles.

Examples of such a releasing agent include low molecular weight polyolefins such as polyethylene, polypropylene, and polybutene; silicones having softening point by heating; fatty acid amides such as oleic amide, erucic amide, ricinoleic amide, and stearic amide; vegetable wax such as carnauba wax, rice wax, candelilla wax, Japan wax, and jojoba oil; animal wax such as beeswax; mineral or petroleum wax such as montan wax, ozokerite, ceresin, paraffin wax, microcrystalline wax, and Fischer-Tropsch wax; and modified products thereof. Among them, the releasing agent is preferably a crystalline compound.

The ink applied to the exemplary embodiment described previously will be described below in detail. As ink, aqueous ink is used. The aqueous ink (hereinafter called ink) contains, in addition to a recording material, an ink solvent (for example, water and/or water soluble organic solvent). If necessary, other additives may also be contained in the ink.

First, the recording material will be explained. The recording material is, for example, a colorant. As the colorant, either a dye or a pigment can be used, but the colorant is preferably a pigment. As the pigment, either an organic pigment or an inorganic pigment can be used. Examples of the black pigment include carbon black pigments such as furnace black, lamp black, acetylene black, and channel black. In addition to black and three primary colors of cyan, magenta and yellow, specific color pigments of red, green blue, brown, white, or the like, metallic luster pigments of gold, silver, or the like, colorless or pale color extender pigments, plastic pigments, or the like may be used. Moreover, a pigment newly synthesized for the invention may be used as well.

Moreover, particles prepared by fixing a dye or a pigment onto silica, alumina, polymer beads as the core, an insoluble lake product of a dye, a colored emulsion, a colored latex, or the like can also be used as a pigment.

Specific examples of the black pigment include, but are not limited to, RAVEN 7000, RAVEN 5750, RAVEN 5250, RAVEN 5000 ULTRA II, RAVEN 3500, RAVEN 2000, RAVEN 1500, RAVEN 1250, RAVEN 1200, RAVEN 1190 ULTRA II, RAVEN 1170, RAVEN 1255, RAVEN 1080 and RAVEN 1060 (manufactured by Columbian Carbon Company); REGAL 400R, REGAL 330R, REGAL 660R, MOGUL L, BLACK PEARLS L, MONARCH 700, MONARCH 800, MONARCH 880, MONARCH 900, MONARCH 1000, MONARCH 1100, MONARCH 1300 and MONARCH 1400 (manufactured by Cabot Corporation): COLOR BLACK FW1, COLOR BLACK FW2, COLOR BLACK FW2V, COLOR BLACK 18, COLOR BLACK FW200, COLOR BLACK S1150, COLOR BLACK S160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A and SPECIAL BLACK 4 (manufactured by Degussa Co.): and No. 25, No. 33, No. 40, No. 47, No. 52, No. 900, No. 2300, MCF-88, MA 600, MA 7, MA 8 and MA 100 (manufactured by Mitsubishi Chemical Co., Ltd.).

While specific examples of the cyan color pigments include C.I. Pigment Blue-1, -2, -3, -15, -15:1, -15:2, -15:3, -15:4, -16, -22 and -60, the pigments are not restricted thereto.

While specific examples of the magenta color pigments include C.I. Pigment Red-5, -7, -12, -48, -48:1, -57, -112, -122, -123, -146, -168, -177, -184, -202, and C.I. Pigment Violet -19, the pigments are not restricted thereto.

While specific examples of the yellow color pigments include C.I. Pigment Yellow-1, -2, -3, -12, -13, -14, -16, -17, -73, -74, -75, -83, 93, -95, -97, -98, -114, 128, -129, -138, -151, -154 and -180, the pigments are not restricted thereto.

Here, in the case where a pigment is used as the colorant, it is preferable to use a pigment dispersing agent in a combination thereof. As a usable pigment dispersing agent, at least one of a polymeric dispersing agent, an anionic surfactant, a cationic surfactant, an amphoteric surfactant, a nonionic surfactant, and the like is used.

As the polymeric dispersing agent, a polymer having a hydrophilic structure part and a hydrophobic structure part can be preferably used. As the polymer having a hydrophilic structure part and a hydrophobic structure part, a condensed polymer and an addition polymer can be used. As the condensed polymer, known polyester dispersing agents can be used. As the addition polymer, addition polymers of monomers having an α,β-ethylenically unsaturated group can be used. By copolymerizing a monomer having an α,β-ethylenically unsaturated group having a hydrophilic group and a monomer having an α,β-ethylenically unsaturated group having a hydrophobic group, a targeted polymeric dispersing agent can be obtained. Moreover, a homopolymer of a monomer having an α,β-ethylenically unsaturated group having a hydrophilic group can be used as well.

As the monomer having an α,β-ethylenically unsaturated group having a hydrophilic group, at least one of monomers having a carboxyl group, a sulfonic acid group, a hydroxyl group, and/or a phosphoric acid group, such as acrylic acid, methacrylic acid, crotonic acid, itaconic acid, itaconic acid monoester, maleic acid, maleic acid monoester, fumaric acid, fumaric acid monoester, vinyl sulfonic acid, styrene sulfonic acid, sulfonated vinylnaphthalene, vinyl alcohol, acrylamide, methacryloxyethyl phosphate, bismethacryloxy ethyl phosphate, methacryloxy ethyl phenyl acid phosphate, ethylene glycol dimethacrylate, and diethylene glycol dimethacrylate can be used.

As the monomer having an α,β-ethylenically unsaturated group having a hydrophobic group, at least one of styrene derivatives such as styrene, methylstyrene and vinyltoluene, vinylcyclohexane, vinylnaphthalene, vinylnaphthalene derivatives, alkyl acrylate, alkyl methacrylate, phenyl methacrylate, cycloalkyl methacrylate, alkyl crotonate, dialkyl itaconate, and dialkyl maleate can be used.

Preferred examples of the copolymer used as the polymeric dispersant include styrene-styrene sulfonic acid copolymer, styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthalene-acrylic acid copolymer, alkyl acrylate-acrylic acid copolymer, alkyl methacrylate-methacrylic acid copolymer, styrene-alkyl methacrylate-methacrylic acid terpolymer, styrene-alkyl acrylate-acrylic acid terpolymer, styrene-phenyl methacrylate-methacrylic acid terpolymer, and styrene-cyclohexyl methacrylate-methacrylic acid terpolymer. A monomer having a polyoxyethylene group or a hydroxyl group may be copolymerized to these polymers.

The polymeric dispersing agent preferably has a weight average molecular weight of about 2,000 to about 50,000.

One of these pigment dispersing agents may be used alone or two or more kinds of them can be used together. Although the addition content of the pigment dispersing agent(s) largely depends on the types of the pigments. However, in general, the total content is about 0.1 to about 100% by weight with respect to the pigment.

A self-dispersible pigment in water can be used as a colorant. The self-dispersible pigment in water used in the present invention refers to a pigment having many water-soluble groups on the surface of the pigment, which pigment can be stably dispersed in water without adding any polymeric dispersant. The self-dispersible pigment in water is practically obtained by applying surface modification treatments such as an acid or a base treatment, a coupling agent treatment, a polymer graft treatment, a plasma treatment or a redox treatment to an ordinary pigment.

In addition to the surface-modified pigments described above, commercially available pigments such as CAB-O-JET-200, CAB-O-JET-300, CAB-O-JET-250, CAB-O-JET-260, CAB-O-JET-270 (manufactured by Cabot Corporation), and MICROJET BLACK CW-1 and CW-2 (manufactured by Orient Chemical Industries, Ltd.) may also be used as the self-dispersible pigment in water.

The self-dispersible pigment is preferably a pigment having at least sulfonic acid, sulfonate, carboxylic acid or carboxylate as a functional group on the surface thereof. It is more preferably a pigment having at least carboxylic acid or carboxylate as a functional group on the surface thereof.

A pigment coated with a resin may also be used as the colorant. Such a pigment is called as a microcapsule pigment, which includes commercially available microcapsule pigments manufactured by Dainippon Ink & Chemicals, Inc. and Toyo Ink MFG Co., Ltd. and microcapsule pigments newly prepared for use in the present invention.

A resin-dispersed pigment having a high-molecular material bound physically or chemically to the above-mentioned pigment may also be used.

Other examples of the recording material include dyes such as a hydrophilic anionic dye, a direct dye, a cationic dye, a reactive dye, a high molecular dye, and an oil-soluble dye, wax powder and resin powder colored by a dye, emulsions, a fluorescent dye and a fluorescent pigment, an infrared absorbent, an ultraviolet absorbent, magnetic materials, including ferromagnetic materials such as ferrite and magnetite, semiconductor such as titanium oxide and zinc oxide, photo catalysts, and organic and inorganic electronic material particles.

The content (concentration) of the recording material is preferably about 5% by weight to about 30% by weight.

The volume average particle size of the recording material is preferably about 10 nm to about 1,000 nm.

The volume average particle size of the recording material denotes the particle size of the recording material itself, or, when an additive such as a dispersing agent is adhered onto the recording material, the size of particles to which the additive is adhered. In the invention, as a device for measuring the volume average particle size, MICROTRUCK UPA particle size analysis meter 9340 (produced by Leeds & Northrup Corp.) is used. The measurement is carried out by placeing 4 ml of an ink in a measurement cell and conducting a predetermined measuring method. As the parameters to be inputted at the time of the measurement, the viscosity of the ink is inputted as viscosity, and the density of the recording material is inputted is inputted as the density of dispersed particles Next, a water-soluble organic solvent will be mentioned. As a water-soluble organic solvent, polyhydric alcohol, a polyhydric alcohol derivative, a nitrogen-containing solvent, alcohol and/or a sulfur-containing solvent may be used.

Specific examples of the water soluble organic solvent include polyhydric alcohols such as ethylene glycol, diethylene glycol, propylene glycol, butylene glycol, triethylene glycol, 1,5-pentanediol, 1,2-hexanediol, 1,2,6-hexanetriol, glycerin, and trimethylolpropane, sugar alcohols such as xylitol, and sugars such as xylose, glycol and galactose.

Specific examples of the polyhydric alcohol derivative include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and the ethylene oxide adduct of diglycerin.

Specific examples of the nitrogen-containing solvent include pyrrolidone, N-methyl-2-pyrrolidone, cyclohexyl pyrrolidone, triethanol amine. Specific examples of the alcohols include ethanol, isopropyl alcohol, butyl alcohol, and benzyl alcohol.

Specific examples of the sulfur-containing solvent include thiodiethanol, thiodiglycerol, sulfolane, and dimethyl sulfoxide.

It is also possible to use propylene carbonate, and/or ethylene carbonate as the water-soluble organic solvent.

One or more water-soluble organic solvent may be used and may be contained in the ink at an amount of about 1 wt % to about 70 wt %.

Next, water will be explained. As the water, in order to prevent introduction of impurities, it is particularly preferable to use deionized water, ultra pure water, distilled water or ultrafiltrated water.

Next, other additives will be explained. A surfactant may be contained in the ink.

As the kinds of the surfactant, at least one of various kinds of anionic surfactants, nonionic surfactants, cationic surfactants, and amphoteric surfactants is used. The at least one surfactant preferably includes an anionic surfactant and/or a nonionic surfactant.

Hereinafter, specific examples of the surfactant are mentioned.

Examples of the anionic surfactant include alkylbenzenesulfonic acid salt, alkylphenylsulfonic acid salt, alkylnaphthalenesulfonic acid salt, higher fatty acid salt, sulfuric acid ester salt of higher fatty acid ester, sulfonic acid salt of higher fatty acid ester, sulfuric acid ester salt and sulfonic acid salt of higher alcohol ether, higher alkylsulfosuccinic acid salt, polyoxyethylene alkyl ether carboxylic acid salt, polyoxyethylene alkyl ether sulfuric acid salt, alkylphosphoric acid salt and polyoxyethylene alkyl ether phosphoric acid salt. The anionic surfactant is preferably dodecylbenzenesulfonic acid salt, isopropylnaphthalenesulfonic acid salt, monobutylphenylphenol monosulfonic acid salt, monobutylbiphenylsulfonic acid salt, monobutylbiphenylsulfonic acid salt and/or dibutylphenylphenoldisulfonic acid salt.

Examples of the nonionic surfactant include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerine fatty acid ester, polyoxyethylene glycerine fatty acid ester, polyglycerine fatty acid ester, sucrose fatty acid ester, polyoxyethylene alkylamine, polyoxyethylene fatty acid amide, alkylalkanol amide, polyethylene glycol/polypropylene glycol block copolymer, acetylene glycol and polyoxyethylene adduct of acetylene glycol. The nonionic surfactant is preferably polyoxyethylene adducts such as polyoxyethylene nonyl phenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylol amide, polyethylene glycol/polypropylene glycol block copolymer, acetylene glycol and/or polyoxyethylene adduct of acetylene glycol.

In addition, silicone surfactants such as polysiloxaneoxyethylene adduct, fluorinated surfactants such as perfluoroalkyl carboxylic acid salt, perfluoroalkyl sulfonic acid salt and oxyethylene perfluoroalkyl ether, biosurfactants such as spiculisporic acid, rhamnolipid and lysolecithin.

One of these surfactants may be used alone or as a mixture thereof can be used. In consideration of solubility, the hydrophile-lipophile balance (HLB) of the surfactant is preferably in the range of about 3 to about 20.

The content of the surfactant(s) to be added is preferably 0.001% by weight to 5% by weight, and more preferably 0.01% by weight to 3% by weight.

Furthermore, additionally, various additives can be contained in the ink, such as a permeating agent, or polyethylene imine, polyamines, polyvinyl pyrrolidone, polyethylene glycol, ethyl cellulose, and carboxy methyl cellulose, in order to adjust the permeation property, or in order to control the ink ejection property, and compounds of alkali metals such as potassium hydroxide, sodium hydroxide and lithium hydroxide to adjust the conductivity and the pH of the ink. As needed, a pH buffer, an antioxidant, a mildew preventing agent, a viscosity adjusting agent, a conductive agent, an ultraviolet ray absorbing agent, and/or a chelating agent can also be contained in the ink.

Preferred characteristics of the ink will be described. First of all, the surface tension of the ink is preferably about 20 to about 45 mN/m.

Here, as the surface tension, the value measured under the conditions of 23° C., and 55% RH by using WILLHERMY type surface tension meter (produced by Kyowa Interface Science Corp.) is used.

The ink viscosity is, for example, about 1.5 to about 30 mPa·s.

The viscosity is a value measured by using RHEOMAT 115 (manufactured by Contraves) at a measuring temperature of 23° C. at a shearing speed of 1400 $s^{-1}$.

The ink composition is not particularly limited to the above configuration, and may include other functional material(s) such as a liquid crystal material and an electronic material, as well as the recording material.

In the exemplary embodiments shown above, a full-color image is recorded on a recording medium 8 by selectively ejecting, on the basis of image data, ink droplets 20A from the ink jet recording heads 20 of the respective colors of black, yellow, magenta and cyan, but use of the apparatus is not limited to printing of letters or images on a recording medium. That is, the apparatus of the invention can be applied to generally industrially used droplet ejection Getting) apparatuses.

EXAMPLES

The invention will be more specifically described below by referring to examples. However, these examples are not intended to limit the scope of the invention.

Examples 1 to 14 to Comparative Examples 1 and 2

A recording apparatus (see FIGS. 1 to 3 wherein only one color (black) recording head is used) having the same structure as in the first exemplary embodiment except that a liquid for neutralization and ink receptive particles are used according to the conditions in Table 1 is used to form an image and the image is evaluated. Here, the thickness (coating amount of a releasing agent) of the releasing layer made of a releasing agent on the intermediate transfer member is 1 μm, the thickness (amount of ink receptive particles supplied) of the particle layer made of ink receptive particles on the intermediate transfer member is 15 μm, the amount of the ink ejected is 4 pL per pixel at an image area density of 1200×1200 dpi (dpi: number of dots per inch), and OK top coated N paper (manufactured by Oji Paper Co., Ltd.) is used as the recording medium. The liquid for neutralization, the ink receptive particles and the ink are prepared as follows.

Preparation of Ink Receptive Particles

—Ink Receptive Particles A—

Styrene/n-butyl methacrylate/methacrylic acid terpolymer particle (proportion of a polar monomer: 33%): 100 parts by weight Amorphous silica (AEROSIL TT600 manufactured by Degussa): 2 parts by weight.

The above materials are mixed and stirred to prepare particles having a sphere-equivalent average diameter of 10 μm. In this manner, ink receptive particles A are obtained.

—Ink Receptive Particles B—

Styrene/n-butyl methacrylate/methacrylic acid terpolymer particle (proportion of a polar monomer having a carboxylic acid group as a polar group: 60%): 95 parts by weight Polyester particles: 5 parts by weight.

Amorphous silica (AEROSIL TT600 manufactured by Degussa): 2 parts by weight.

The above materials are mixed and stirred to prepare particles having a sphere-equivalent average diameter of 10 μm. In this manner, ink receptive particles B are obtained.

—Particles C—

Styrene/n-butyl methacrylate/methacrylic acid terpolymer particles (proportion of a polar monomer having a carboxylic acid group as a polar group: 12.5%): 100 parts by weight Amorphous silica (AEROSIL TT600 manufactured by Degussa): 2 parts by weight.

The above materials are mixed and stirred to prepare particles having a sphere-equivalent average diameter of 10 μm. In this manner, ink receptive particles C are obtained.

—Particles D—

Styrene/n-butyl methacrylate/methacrylic acid terpolymer particles (proportion of a polar monomer having a carboxylic acid group as a polar group: 87.5%): 90 parts by weight Polyester particles: 10 parts by weight.

Amorphous silica (AEROSIL TT600 manufactured by Degussa): 2 parts by weight.

The above materials are mixed and stirred to prepare particles having a sphere-equivalent average diameter of 10 μm. In this manner, ink receptive particles D are obtained.

—Particles E—

Styrene/n-butyl methacrylate/methacrylic acid terpolymer particles (proportion of a polar monomer having a carboxylic acid group as a polar group: 82%): 90 parts by weight Polyester particles: 10 parts by weight.

Amorphous silica (AEROSIL TT600 manufactured by Degussa): 2 parts by weight.

The above materials are mixed and stirred to prepare particles having a sphere-equivalent average diameter of 10 μm. In this manner, ink receptive particles E are obtained.

—Particles F—

Styrene/N-(2-hydroxypropyl)methacrylamide/4-vinylpyridine terpolymer particles (proportion of a polar monomer having an amino group as a polar group: 20 mol %): 90 parts by weight Polyester particles: 10 parts by weight.

Amorphous silica (AEROSIL TT600 manufactured by Degussa): 2 parts by weight.

The above materials are mixed and stirred to prepare particles having a sphere-equivalent average diameter of 10 μm. In this manner, ink receptive particles F are obtained.

Liquids for Neutralization, and Inks

—Liquid A—

Glycerin: 30 parts by weight

Propylene glycol: 5 parts by weight 1,2-Hexanediol: 2 parts by weight

OLFINE E1010 (manufactured by Nissin Chemical Industry Co., Ltd.): 1.5 parts by weight NaOH: suitable amount Water: balance The above materials are mixed and the resultant liquid has an adjusted pH of 13.1. NaOH is used to adjust the pH. The surface tension of this liquid is 28 mN/m.

—Liquid B—

Diglycerin-EO adduct: 30 parts by weight

Diethylene glycol: 10 parts by weight 1,2-Hexanediol: 5 parts by weight

OLFINE E1010 (manufactured by Nissin Chemical Industry Co., Ltd.): 1 part by weight LiOH: suitable amount Water: balance The above materials are mixed and the resultant liquid has an adjusted pH of 11. NaOH is used to adjust the pH. The surface tension of this liquid is 29 mN/m.

—Liquid C—

Diglycerin-EO adduct: 30 parts by weight

Propylene glycol: 10 parts by weight

Diethylene glycol monobutyl ether: 5 parts by weight

OLFINE E1010 (manufactured by Nissin Chemical Industry Co., Ltd.): 0.75 parts by weight Diethanolamine: suitable amount Water: balance The above materials are mixed and the resultant liquid has an adjusted pH of 8.8. Diethanolamine is used to adjust the pH. The surface tension of this liquid is 34 mN/m.

—Liquid D—

Carbon black (CB): 5 parts by weight

Styrene/n-butyl methacrylate/methacrylic acid terpolymer: 1.5 parts by weight

Glycerin: 20 parts by weight

Triethylene glycol: 5 parts by weight

Diethylene glycol monobutyl ether: 2 parts by weight

OLFINE E1010 (manufactured by Nissin Chemical Industry Co., Ltd.): 1 part by weight Water: balance The above materials are mixed to give a liquid. The surface tension of this liquid is 31 mN/m.

—Liquid E—

C.I. Pigment Blue 15:3: 5 parts by weight

Styrene/n-butyl methacrylate/methacrylic acid terpolymer: 2 parts by weight

Glycerin: 20 parts by weight

Triethylene glycol: 5 parts by weight

Diethylene glycol monobutyl ether: 2 parts by weight

OLFINE E1010 (manufactured by Nissin Chemical Industry Co., Ltd.): 0.75 parts by weight Water: balance The above materials are mixed to give a liquid. The surface tension of this liquid is 32 mN/m.

—Liquid F—

C.I. Pigment Blue 15:3: 4 parts by weight

Styrene/n-butyl methacrylate/methacrylic acid terpolymer: 2.5 parts by weight

Glycerin: 20 parts by weight

Propylene glycol: 5 parts by weight 1,2-Hexanediol: 5 parts by weight

OLFINE E1010 (manufactured by Nissin Chemical Industry Co., Ltd.): 0.1 parts by weight Water: balance The above materials are mixed to give a liquid. The surface tension of this liquid is 42 mN/m.

—Liquid G—

Glycerin: 30 parts by weight

Propylene glycol: 5 parts by weight 1,2-Hexanediol: 2 parts by weight

Silicone surfactant (KF-6012 manufactured by Shin-Etsu Silicone): 0.1 parts by weight OLFINE E1010 (manufactured by Nissin Chemical Industry Co., Ltd.): 0.3 parts by weight NaOH: suitable amount Water: balance The above materials are mixed and the resultant liquid has an adjusted pH of 12.3. NaOH is used to adjust the pH. The surface tension of this liquid is 22 mN/m.

—Liquid H—

Diglycerin-EO adduct: 30 parts by weight

Diethylene glycol: 10 parts by weight 1,2-Hexanediol: 5 parts by weight

Fluorinated surfactant (UNIDYNE DS102 manufactured by DAIKIN INDUSTRIES, Ltd.): 0.1 parts by weight LiOH: suitable amount Water: balance The above materials are mixed and the resultant liquid has an adjusted pH of 10.8. LiOH is used to adjust the pH. The surface tension of this liquid is 17 mN/m.

—Liquid I—

Diglycerin-EO adduct: 30 parts by weight

Diethylene glycol: 10 parts by weight 1,2-Hexanediol: 5 parts by weight

OLFINE E1010 (manufactured by Nissin Chemical Industry Co., Ltd.): 1 part by weight Magnesium nitrate.$6H_2O$: 1 part by weight Hydrochloric acid: suitable amount Water: balance The above materials are mixed and the resultant liquid has an adjusted pH of 4. An aqueous solution of hydrochloric acid is used to adjust the pH. The surface tension of this liquid is 31 mN/m.

—Liquid J—

Carbon black (CB): 5 parts by weight

Styrene/n-butyl methacrylate/methacrylic acid terpolymer: 1.5 parts by weight

Glycerin: 20 parts by weight

Triethylene glycol: 5 parts by weight

Diethylene glycol monobutyl ether: 2 parts by weight

Silicone surfactant (KF-6012 manufactured by Shin-Etsu Silicone): 0.3 parts by weight OLFINE E1010 (manufactured by Nissin Chemical Industry Co., Ltd.): 0.5 parts by weight Water: balance The above materials are mixed to give a liquid. The surface tension of this liquid is 24 mN/m.

—Liquid K—

C.I. Pigment Blue 15:3: 5 parts by weight

Styrene/n-butyl methacrylate/methacrylic acid terpolymer: 2.5 parts by weight

Glycerin: 20 parts by weight

Triethylene glycol: 5 parts by weight

Diethylene glycol monobutyl ether: 2 parts by weight

Fluorinated surfactant (UNIDYNE DS102 manufactured by DAIKIN INDUSTRIES, Ltd.): 0.2 parts by weight
OLFINE E1010 (manufactured by Nissin Chemical Industry Co., Ltd.): 0.3 parts by weight
Water: balance The above materials are mixed to give a liquid. The surface tension of this liquid is 19 mN/m.

—Liquid L—

C.I. Pigment Blue 15:3: 5 parts by weight
Styrene/n-butyl methacrylate/dimethylamino methacrylate terpolymer: 2 parts by weight
Glycerin: 20 parts by weight
Triethylene glycol: 5 parts by weight
Diethylene glycol monobutyl ether: 2 parts by weight
OLFINE E1010 (manufactured by Nissin Chemical Industry Co., Ltd.): 0.75 parts by weight
Water: balance The above materials are mixed to give a liquid. The surface tension of this liquid is 32 mN/m.

—Liquid M—

Glycerin: 30 parts by weight
Propylene glycol: 5 parts by weight
1,2-Hexanediol: 2 parts by weight
OLFINE E1010 (manufactured by Nissin Chemical Industry Co., Ltd.): 1.5 parts by weight
NaOH: suitable amount
Water: balance The above materials are mixed and the resultant liquid has an adjusted pH of 7.5. NaOH is used to adjust the pH. The surface tension of this liquid is 28 mN/m.

—Liquid N—

Diglycerin-EO adduct: 30 parts by weight
Diethylene glycol: 10 parts by weight
1,2-Hexanediol: 5 parts by weight
OLFINE E1010 (manufactured by Nissin Chemical Industry Co., Ltd.): 1 part by weight
Hydrochloric acid: suitable amount
Water: balance The above materials are mixed and the resultant liquid has an adjusted pH of 6.4. An aqueous solution of hydrochloric acid is used to adjust the pH. The surface tension of this liquid is 31 mN/m.

—Liquid O—

Glycerin: 30 parts by weight
Propylene glycol: 5 parts by weight
Diethylene glycol monobutyl ether: 0.5 parts by weight
NaOH: suitable amount
Water: balance The above materials are mixed and the resultant liquid has an adjusted pH of 12.5. NaOH is used to adjust the pH. The surface tension of this liquid is 38 mN/m.

Evaluation

—Drying Time—

OK Kondo (manufactured by Oji Paper Co., Ltd.) is used as the recording medium, and a 100% coverage pattern is prepared thereon, and after a predetermined time, another OK Kondo paper is pressed under loading of $1.9\times10^4$ N/m$^2$ against the print pattern. The time when the liquid is no longer transferred to the pressed OK Kondo paper is determined as the drying time.

The evaluation criteria are as follows:

a: The drying time is less than 0.5 seconds.

b: The drying time is less than 1 second ("b-" indicates an evaluation criterion classified into longer drying time than "b").

c: The drying time is 1 second or more and less than 3 seconds.

d: The drying time is 3 seconds or more.

—Image Density—

Image density is evaluated in the following manner. A 100% coverage pattern is printed, and the optical density of the printed portion is measured with X-RITE 404 (manufactured by X-Rite, Incorporated).

The evaluation criteria are as follows:

a: The optical density is 1.45 or more.

b: The optical density is 1.4 or more and less than 1.5 ("b-" indicates an evaluation criterion classified into lower optical density than "b").

c: The optical density is 1.35 or more and less than 1.4.

c-: The optical density is 1.3 or more and less than 1.35.

d: The optical density is less than 1.3.

—Bleeding—

Bleeding is evaluated in the following manner. A one-dot line pattern is printed, and the bleeding of the line is sensorily evaluated by reference to boundary samples for which the degrees of line bleeding has been preliminarily determined.

The evaluation criteria are as follows:

a: No bleeding is found on an enlarged image (×25) of the image portion.

b: Bleeding can be found on an enlarged image (×25) of the image portion, but cannot be found visually (that is, without magnification) and is acceptable ("b-" indicates an evaluation criterion classified into more bleeding than "b").

c: Bleeding can be visually found but is acceptable.

d: Bleeding is found visually and the degree of bleeding is severe and not acceptable.

TABLE 1

| | Ink receptive particles | | | Liquid for neutralization | | | | Ink | | | Liquid for neutralization/particle ratio (wt %) | Drying time | Image density | Bleeding |
|---|---|---|---|---|---|---|---|---|---|---|---|---|---|---|
| | Type | Application amount (g/m$^2$) | Proportion of polar monomer (mol %) | Type | pH | Application amount (g/m$^2$) | Surface tension (mN/m) | Type | Application amount (g/m$^2$) | Surface tension (mN/m) | | | | |
| Example 1 | A | 7 | 33 | A | 13.1 | 1 | 28 | D | 5 | 31 | 14 | a | a | a |
| Example 2 | B | 6 | 60 | B | 11 | 0.6 | 29 | E | 4 | 32 | 10 | a | a | a |
| Example 3 | C | 10 | 12.5 | C | 8.8 | 2.8 | 34 | D | 5 | 31 | 28 | b | b | b |
| Example 4 | B | 5 | 60 | A | 13.1 | 0.7 | 28 | F | 4 | 42 | 14 | a | a | a |

TABLE 1-continued

| | Ink receptive particles | | | Liquid for neutralization | | | | Ink | | | Liquid for neutral-ization/particle ratio (wt %) | | | |
|---|---|---|---|---|---|---|---|---|---|---|---|---|---|---|
| | Type | Application amount ($g/m^2$) | Proportion of polar monomer (mol %) | Type | pH | Application amount ($g/m^2$) | Surface tension (mN/m) | Type | Application amount ($g/m^2$) | Surface tension (mN/m) | | Drying time | Image density | Bleeding |
| Example 5 | C | 4 | 12.5 | B | 11 | 0.35 | 29 | D | 3 | 31 | 8.8 | b | b | b |
| Example 6 | A | 6 | 33 | C | 8.8 | 0.27 | 34 | E | 3 | 32 | 4.5 | b | b | b– |
| Example 7 | D | 7 | 87.5 | G | 12.3 | 1.3 | 22 | J | 4 | 24 | 19 | b | b | b |
| Example 8 | E | 15 | 82 | H | 10.8 | 3.7 | 17 | K | 2 | 19 | 25 | b | b– | b |
| Example 9 | F | 7 | 20 | I | 4 | 2.2 | 31 | L | 2 | 32 | 31 | b | b– | b |
| Example 10 | E | 15 | 82 | H | 10.8 | 5.2 | 17 | K | 2 | 19 | 34 | b– | b | b |
| Example 11 | E | 15 | 82 | H | 10.8 | 0.1 | 17 | K | 2 | 19 | 0.6 | b– | b– | b– |
| Example 12 | A | 7 | 33 | M | 7.5 | 1 | 28 | D | 5 | 31 | 14 | b– | b | b– |
| Example 13 | F | 7 | 20 | N | 6.4 | 2.2 | 31 | L | 2 | 32 | 31 | b– | b– | b |
| Example 14 | A | 7 | 33 | O | 12.5 | 1.3 | 38 | D | 5 | 31 | 19 | b– | b | b– |
| Comparative Example 1 | A | 7 | 33 | | — (not applied) | | | D | 5 | 31 | — | c | c | c |
| Comparative Example 2 | C | 6 | 12.5 | | — (not applied) | | | E | 4 | 32 | — | c | c | c |

Liquid for neutralization/particle ratio: The mass ratio of the amount of the liquid for neutralization to the amount of the particles applied per unit area.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A recording apparatus comprising:

an intermediate transfer member;

a feeding unit that feeds, to the intermediate transfer member, ink receptive particles containing at least an organic resin whose monomers include at least one polar monomer having at least one polar group, a ratio of the at least one polar monomer to all the monomers of the organic resin being about 10 mol % to about 90 mol %;

a liquid application unit that applies a liquid that neutralizes the at least one polar group of the at least one polar monomer, onto the ink receptive particles fed onto the intermediate transfer member;

an ink application unit that applies an ink to the ink receptive particles fed onto the intermediate transfer member;

a transfer unit that transfers the ink receptive particles onto a recording medium; and a fixing unit that fixes the ink receptive particles on the recording medium.

2. The recording apparatus of claim 1, wherein the amount of the liquid applied is about 0.25 to about 5 $g/m^2$.

3. The recording apparatus of claim 1, wherein the amount of the liquid applied is about 0.5 to about 2.0 $g/m^2$.

4. The recording apparatus of claim 1, wherein a mass ratio of the liquid applied to the ink receptive particles per unit area is about 1 to about 30%.

5. The recording apparatus of claim 1, wherein a mass ratio of the liquid applied to the ink receptive particles per unit area is about 1 to about 20%.

6. The recording apparatus of claim 1, wherein the at least one polar group of the at least one polar monomer is anionic and the pH of the liquid is about 8 or more.

7. The recording apparatus of claim 1, wherein the at least one polar group of the at least one polar monomer is cationic and the pH of the liquid is about 6 or less.

8. The recording apparatus of claim 1, wherein the surface tension of the liquid is about 20 to about 35 mN/m.

9. A recording apparatus comprising:

a feeding unit that feeds, to a recording medium, ink receptive particles containing at least a resin whose monomers include at least one polar monomer having at least one polar group, a ratio of the at least one polar monomer to all the monomers of the resin being about 10 mol % to about 90 mol %;

a liquid application unit that applies a liquid that neutralizes the at least one polar group of the at least one polar monomer, onto the ink receptive particles fed onto the recording medium;

an ink application unit that applies an ink to the ink receptive particles fed onto the recording medium; and a fixing unit that fixes the ink receptive particles on the recording medium.

10. The recording apparatus of claim 9, wherein the amount of the liquid applied is about 0.25 to about 5 $g/m^2$.

11. The recording apparatus of claim 9, wherein the amount of the liquid applied is about 0.5 to about 2.0 $g/m^2$.

12. The recording apparatus of claim 9, wherein a mass ratio of the liquid applied to the ink receptive particles per unit area is about 1 to about 30%.

13. The recording apparatus of claim 9, wherein a mass ratio of the liquid applied to the ink receptive particles per unit area is about 1 to about 20%.

14. The recording apparatus of claim 9, wherein the at least one polar group of the at least one polar monomer is anionic and the pH of the liquid is about 8 or more.

15. The recording apparatus of claim 9, wherein the at least one polar group of the at least one polar monomer is cationic and the pH of the liquid is about 6 or less.

16. The recording apparatus of claim 9, Wherein the surface tension of the liquid is about 20 to about 35 mN/m.

17. A recording method comprising:

feeding, to an intermediate transfer member, ink receptive particles containing at least an organic resin whose monomers include at least one polar monomer having at least one polar group, a ratio of the at least one polar monomer to all the monomers of the organic resin being about 10 mol % to about 90 mol %;

applying a liquid that neutralizes the at least one polar group of the at least one polar monomer, onto the ink receptive particles fed onto the intermediate transfer member;

applying an ink to the ink receptive particles fed onto the intermediate transfer member;

transferring the ink receptive particles onto a recording medium; and fixing the ink receptive particles on the recording medium.

18. A recording method comprising:

feeding, to a recording medium, ink receptive particles containing at least a resin whose monomers include at least one polar monomer having at least one polar group, a ratio of the at least one polar monomer to all the monomers of the resin being about 10 mol % to about 90 mol %;

applying a liquid that neutralizes the at least one polar group of the at least one polar monomer, onto the ink receptive particles fed onto the recording medium;

applying an ink to the ink receptive particles fed onto the recording medium; and fixing the ink receptive particles on the recording medium.

* * * * *